United States Patent
Sudeji et al.

(10) Patent No.: US 9,658,377 B2
(45) Date of Patent: May 23, 2017

(54) PHASE DIFFERENCE FILM LAYERED BODY AND METHOD FOR PRODUCING THE SAME HAVING MICROMETER-SCALE PARTICLES IN A SUBSEQUENTLY-REMOVED LAYER

(75) Inventors: Hironari Sudeji, Tokyo (JP); Taku Hatano, Tokyo (JP)

(73) Assignee: ZEON CORPORATION, Tokyo (JP)

(*) Notice: Subject to any disclaimer, the term of this patent is extended or adjusted under 35 U.S.C. 154(b) by 280 days.

(21) Appl. No.: 13/976,551

(22) PCT Filed: Dec. 20, 2011

(86) PCT No.: PCT/JP2011/079513
§ 371 (c)(1),
(2), (4) Date: Jun. 27, 2013

(87) PCT Pub. No.: WO2012/090791
PCT Pub. Date: Jul. 5, 2012

(65) Prior Publication Data
US 2013/0271835 A1    Oct. 17, 2013

(30) Foreign Application Priority Data
Dec. 28, 2010   (JP) .................................. 2010-292932

(51) Int. Cl.
*G02B 5/30*    (2006.01)
*B29C 55/02*    (2006.01)
(Continued)

(52) U.S. Cl.
CPC .......... *G02B 5/3083* (2013.01); *B29C 55/023* (2013.01); *B29C 55/143* (2013.01);
(Continued)

(58) Field of Classification Search
None
See application file for complete search history.

(56) References Cited

U.S. PATENT DOCUMENTS 6,524,420 B1 *   2/2003   Bristow .............. B29C 47/0047
156/242
2006/0040106 A1 *   2/2006   Arakawa et al. .......... 428/411.1
(Continued)

FOREIGN PATENT DOCUMENTS

CN    1930500 A    3/2007
CN    101539643 A    9/2009
(Continued)

OTHER PUBLICATIONS

Japanese Notice of Allowance for Japanese Application No. 2012-550866, dated Nov. 18, 2014, with an English translation.
(Continued)

*Primary Examiner* — Stephone B Allen
*Assistant Examiner* — Ryan S Dunning
(74) *Attorney, Agent, or Firm* — Birch, Stewart, Kolasch & Birch, LLP

(57) ABSTRACT

By provision of an A layer consisting of a resin having a positive intrinsic birefringence value; a B layer consisting of a resin containing a styrene polymer and having a negative intrinsic birefringence value; and a C layer consisting of a resin containing a polymer having an alicyclic structure, in this order; a phase difference film wherein, when the C layer is removed, retardation Re at an incident angle of 0° and retardation $R_{40}$ at an incident angle of 40° satisfy a relationship of $0.92 \leq R_{40}/Re \leq 1.08$ is realized.

14 Claims, 1 Drawing Sheet

(51) Int. Cl.
  *B29D 11/00* (2006.01)
  *B29C 55/14* (2006.01)
  *B32B 27/08* (2006.01)
  *B32B 27/30* (2006.01)
  *G02F 1/13363* (2006.01)

(52) U.S. Cl.
  CPC .... *B29D 11/0073* (2013.01); *B29D 11/00644* (2013.01); *B32B 27/08* (2013.01); *B32B 27/302* (2013.01); *B29K 2995/0032* (2013.01); *B32B 2307/42* (2013.01); *B32B 2551/00* (2013.01); *G02F 1/133634* (2013.01); *G02F 2001/133635* (2013.01); *G02F 2201/38* (2013.01); *G02F 2202/40* (2013.01); *G02F 2413/11* (2013.01); *G02F 2413/12* (2013.01); *G02F 2413/13* (2013.01); *G02F 2413/14* (2013.01)

(56) References Cited

U.S. PATENT DOCUMENTS

| | | |
|---|---|---|
| 2007/0159576 A1 | 7/2007 | Tanabe et al. |
| 2007/0172606 A1* | 7/2007 | Shunsuke et al. ........... 428/1.31 |
| 2009/0220758 A1 | 9/2009 | Hatano |
| 2009/0237790 A1 | 9/2009 | Hatano et al. |
| 2009/0290103 A1 | 11/2009 | Itou |
| 2009/0316094 A1* | 12/2009 | La et al. ....................... 349/118 |
| 2011/0069257 A1 | 3/2011 | Yamanaka et al. |

FOREIGN PATENT DOCUMENTS

| | | |
|---|---|---|
| JP | 6-59121 A | 3/1994 |
| JP | 2002-107542 A | 4/2002 |
| JP | 2002-156525 A | 5/2002 |
| JP | 2004-58361 A | 2/2004 |
| JP | 2005-274725 A | 10/2005 |
| JP | 2007-199616 A | 8/2007 |
| JP | 2009-192845 A | 8/2009 |
| JP | 2010-91646 A | 4/2010 |
| KR | 10-2009-0088323 A | 8/2009 |

OTHER PUBLICATIONS

Chinese Office Action issue in Chinese Patent Application No. 201180063142.7 on Nov. 21, 2014.
International Search Report issued in PCT/JP2011/079513, mailed on Jan. 24, 2012.
Written Opinion of the International Searching Authority issued in PCT/JP2011/079513, mailed on Jan. 24, 2012.
Korean Office Action, dated Dec. 26, 2016, for Korean Application No. 10-2013-7016623, as well as a Machine translation.

* cited by examiner

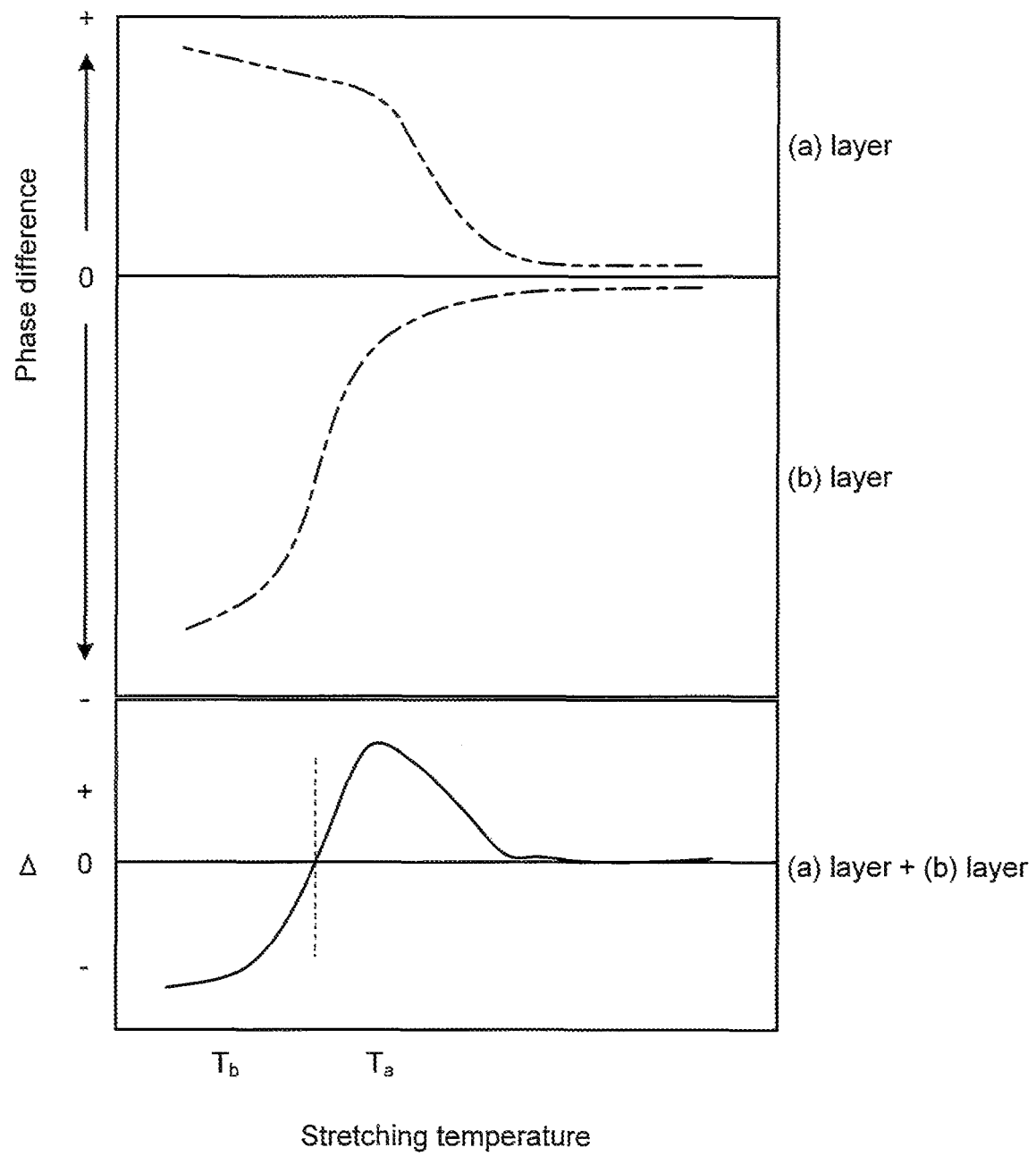

PHASE DIFFERENCE FILM LAYERED BODY AND METHOD FOR PRODUCING THE SAME HAVING MICROMETER-SCALE PARTICLES IN A SUBSEQUENTLY-REMOVED LAYER

FIELD

The present invention relates to a phase difference film layered body and a method for producing the same.

BACKGROUND

A phase difference film used for, e.g., optical compensation of a liquid crystal display device is required to be capable of reducing a change in the color tone of the display device at different observation angles, and various techniques have been continuously developed. For example, Patent Literature 1 proposes a phase difference film in which a layer consisting of a transparent resin and having substantially no orientation is provided on at least one side of a layer consisting of a resin having a negative intrinsic birefringence value. Patent Literature 2 proposes a technique for producing a phase difference film satisfying the relationship of $0.92 \leq R_{40}/Re \leq 1.08$, where Re is retardation at an incident angle of 0° and $R_{40}$ is retardation at an incident angle of 40°. This phase difference film is produced by appropriately stretching a layered film composed of a layer consisting of a resin having a positive intrinsic birefringence value and a layer consisting of a resin having a negative intrinsic birefringence value. When Re and $R_{40}$ satisfy the aforementioned relationship, the angular dependence of the color tone of a liquid crystal display device can b reduced.

CITATION LIST

Patent Literature

Patent Literature 1: Japanese Patent Application Laid-Open No. 2005-274725 A
Patent Literature 2: Japanese Patent Application Laid-Open No. 2009-192845 A

SUMMARY

Technical Problem

The phase difference film obtained by the aforementioned conventional technique satisfying the relationship of $0.92 \leq R_{40}/Re \leq 1.08$ has poor handling capability. More specifically, in the conventional technique, the phase difference film is provided with the layer consisting of the resin having a negative intrinsic birefringence value. However, the resin having a negative intrinsic birefringence value has poor strength, and is brittle. Therefore, if the layer consisting of the resin having a negative intrinsic birefringence value is exposed at the surface of the phase difference film, the layer consisting of the resin having a negative intrinsic birefringence value is easily ruptured during handling of the phase difference film.

As to the phase difference film as in Patent Literature 2 including the layer consisting of the resin having a positive intrinsic birefringence value and the layer consisting of the resin having a negative intrinsic birefringence value, there is a possible alternative in which, in order to protect the low-strength layer consisting of the resin having a negative intrinsic birefringence value, this layer is sandwiched between a pair of layers consisting of the resin having a positive intrinsic birefringence value. However, such a structure requires a plurality of the layers consisting of the resin having a positive intrinsic birefringence value. Therefore, such a structure requires complicated control of retardation (a phase difference), and the entire phase difference film becomes thick. In addition, since such a phase difference film has insufficient flexibility, fluttering may occur during conveyance. Therefore it is desirable to improve handling capability of the film.

Further, there is known another known technique in which a protective film is laminated onto a phase difference film. Usually, the protective film is removed from the phase difference film upon using the phase difference film. Therefore, the use of the protective film can protect the phase difference film and improve its handling capability during, e.g., conveyance without an increase in the thickness of the phase difference film. However, when such a protective film is laminated onto a phase difference film, the process of producing the phase difference film becomes complicated because of the production of the protective film and the laminating thereof. Therefore, it is desirable to improve the production process in terms of production efficiency.

The present invention has been devised in view of the foregoing problems, and it is an object of the present invention to provide a phase difference film layered body that can easily provide a phase difference film in which retardation Re at an incident angle of 0° and retardation $R_{40}$ at an incident angle of 40° satisfy the relationship of $0.92 \leq R_{40}/Re \leq 1.08$ and which has high handling capability and to provide a method for efficiently producing the phase difference film layered body.

Solution to Problem

The present inventors have conducted extensive studies to solve the foregoing problems and found out that, by providing a layer consisting of a resin having a positive intrinsic birefringence value, a layer consisting of a resin containing a styrene polymer and having a negative intrinsic birefringence value, and a layer consisting of a resin containing a polymer having an alicyclic structure in this order, a phase difference film layered body that can easily provide a phase difference film satisfying the relationship of $0.92 \leq R_{40}/Re \leq 1.08$ and having high handling capability can be realized. Thus, the present invention has been completed.

The gist of the present invention is given as in the following (1) to (6).

(1) A phase difference film layered body comprising:
an A layer consisting of a resin having a positive intrinsic birefringence value;
a B layer consisting of a resin containing a styrene polymer and having a negative intrinsic birefringence value; and
a C layer consisting of a resin containing a polymer having an alicyclic structure, in this order; wherein,
a layer portion that is a portion of the layered body other than the C layer has retardation Re at an incident angle of 0° and retardation $R_{40}$ at an incident angle of 40° satisfying a relationship of $0.92 \leq R_{40}/Re \leq 1.08$.

(2) The phase difference film layered body according to (1), wherein the resin containing the polymer having an alicyclic structure contains particles.

(3) The phase difference film layered body according to (1) or (2), wherein the resin having a positive intrinsic birefringence value contains polycarbonate.

(4) A method for producing the phase difference film layered body according to any of (1) to (3), the method comprising:

a step of coextruding the resin having a positive intrinsic birefringence value, the resin containing the styrene polymer and having a negative intrinsic birefringence value, and the resin containing the polymer having an alicyclic structure to thereby obtain a pre-stretch film, wherein the pre-stretch film includes a layer consisting of the resin having a positive intrinsic birefringence value, a layer consisting of the resin including the styrene polymer and having a negative intrinsic birefringence value, and a layer consisting of the resin containing the polymer having an alicyclic structure, wherein a layer portion that is a portion of the pre-stretch film other than the layer consisting of the resin containing the polymer having an alicyclic structure causes a phase delay when the pre-stretch film is uniaxially stretched in a direction of an X-axis at a temperature T1 and causes a phase advancement when the pre-stretch film is uniaxially stretched in the direction of the X-axis at a temperature T2 that is different from the temperature T1, the phase delay and the phase advancement being of a phase of linearly polarized light incident perpendicularly on a film surface and having a plane of vibration of an electric vector lying in an XZ plane with respect to a phase of linearly polarized light incident perpendicularly on the film surface and having a plane of vibration of an electric vector lying in a YZ plane wherein the X-axis is a direction of uniaxial stretching, the Y-axis is a direction in a film plane orthogonal to the direction of uniaxial stretching, and the Z-axis is a direction of a thickness of the film;

a first stretching step of subjecting the pre-stretch film to a uniaxial stretching treatment in one direction at one of the temperatures T1 and T2; and a second stretching step of performing a uniaxial stretching treatment in a direction orthogonal to the direction for the uniaxial stretching treatment performed in the first stretching step at the different one of the temperatures T2 and T1.

(5) A method for producing a phase difference film, comprising removing, from the phase difference film layered body according to (1), the C layer.

(6) A method for producing a phase difference film, comprising:

a step of coextruding a resin having a positive intrinsic birefringence value, a resin containing a styrene polymer and having a negative intrinsic birefringence value, and a resin containing a polymer having an alicyclic structure, to thereby obtain a pre-stretch film, wherein the pre-stretch film includes a layer consisting of the resin having a positive intrinsic birefringence value, a layer consisting of the resin including the styrene polymer and having a negative intrinsic birefringence value, and a layer consisting of the resin containing the polymer having an alicyclic structure in this order, wherein a layer portion that is a portion of the pre-stretch film other than the layer consisting of the resin containing the polymer having an alicyclic structure causes a phase delay when the pre-stretch film is uniaxially stretched in a direction of an X-axis at a temperature T1 and causes a phase advancement when the pre-stretch film is uniaxially stretched in the direction of the X-axis at a temperature T2 that is different from the temperature T1, the phase delay and the phase advancement being of a phase of linearly polarized light incident perpendicularly on a film surface and having a plane of vibration of an electric vector lying in an XZ plane with respect to a phase of linearly polarized light incident perpendicularly on the film surface and having a plane of vibration of an electric vector lying in a YZ plane wherein the X-axis is a direction of uniaxial stretching, the Y-axis is a direction in a film plane orthogonal to the direction of uniaxial stretching, and the Z-axis is a direction of a thickness of the film;

a first stretching step of subjecting the pre-stretch film to a uniaxial stretching treatment in one direction at one of the temperatures T1 and T2;

a second stretching step of performing a uniaxial stretching treatment in a direction orthogonal to the one direction for the uniaxial stretching treatment performed in the first stretching step at the different one of the temperatures T2 and T1, to thereby obtain a phase difference film layered body, wherein the phase difference film layered body includes an A layer consisting of the resin having a positive intrinsic birefringence value, a B layer including the styrene polymer and having a negative intrinsic birefringence value, and a C layer consisting of the resin containing the polymer having an alicyclic structure in this order, and wherein a layer portion that is a portion of the layered body other than the C layer has retardation Re at an incident angle of 0° and retardation $R_{40}$ at an incident angle of 40° satisfying a relationship of $0.92 \leq R_{40}/Re \leq 1.08$; and a step of removing the C layer from the phase difference film layered body.

Advantageous Effects of Invention

According to the phase difference film layered body of the present invention and the method for producing a phase difference film of the present invention, a phase difference film in which retardation Re at an incident angle of 0° and retardation $R_{40}$ at an incident angle of 40° satisfy the relationship of $0.92 \leq R_{40}/Re \leq 1.08$ and which has high handling capability can be easily obtained.

According to the method for producing the phase difference film layered body of the present invention, the phase difference film layered body of the present invention can be efficiently produced.

BRIEF DESCRIPTION OF DRAWING

FIG. 1 shows an example of the temperature dependence of retardation A when each of the (a) layer and the (b) layer in a pre-stretch film is stretched and an example of the temperature dependence of retardation A when a layer portion of the pre-stretch film that is a portion thereof other than the (c) layer (in this case, the (a) layer+(b) layer) is stretched, where it is assumed that the glass transition temperature $Tg_A$ of a resin forming the (a) layer is higher and the glass transition temperature $Tg_B$ of a resin forming the (b) layer is lower.

DESCRIPTION OF EMBODIMENTS

The present invention will be described hereinbelow in detail by way of embodiments and examples. However, the present invention is not limited to the following embodiments and examples and may be implemented with any optional modifications within a range that does not depart from the scope of claims of the present invention.

In the following description, the sign "A" in "A layer", the sign "B" in "B layer", the sign "C" in "C layer", the sign "(a)" in "(a) layer", the sign "(b)" in "(b) layer", and the sign "(c)" in "(c) layer" are signs for distinguishing elements assigned with these signs from other elements, and do not have any meaning other than the distinction between these elements. In the following description, "(meth)acrylic acid" means "acrylic acid" and "methacrylic acid".

[1. Phase Difference Film Layered Body]

The phase difference film layered body of the present invention includes an A layer consisting of a resin having a positive intrinsic birefringence value, a B layer consisting of a resin containing a styrene polymer and having a negative intrinsic birefringence value, and a C layer consisting of a resin containing a polymer having an alicyclic structure, in this order. The phase difference film layered body of the present invention has a structure in which a phase difference film including the A layer and the B layer is stacked with the C layer for protecting the B layer. Usually, upon using the phase difference film, the C layer is removed from the phase difference film layered body of the present invention.

That the intrinsic birefringence value is positive means that the refractive index in the stretched direction is larger than the refractive index in the direction orthogonal to the stretched direction. That the intrinsic birefringence value is negative means that the refractive index in the stretched direction is smaller than the refractive index in the direction orthogonal to the stretched direction. The intrinsic birefringence value may also be calculated from a permittivity distribution.

[1-1. A Layer]

The A layer consists of a resin having a positive intrinsic birefringence value. The resin having a positive intrinsic birefringence value contains at least one type of polymer. Examples of the polymer contained in the resin having a positive intrinsic birefringence value may include: olefin polymers such as polyethylene and polypropylene; polyesters such as polyethylene terephthalate and polybutylene terephthalate; polyarylene sulfides such as polyphenylene sulfide; polyvinyl alcohols; polycarbonates; polyarylates; cellulose esters; polyether sulfones; polysulfones; polyarylsulfones; polyvinyl chlorides; norbornene polymers; and rod-shaped liquid crystal polymers. One species thereof may be used alone, or two or more species thereof may be used in combination at any ratio. Of these, polycarbonates are preferred from the viewpoint of expression of retardation, stretchability at low temperatures, and adhesion to other layers.

As the polycarbonate, any polymer having a repeating unit including a carbonate bond (—O—C(=O)—O—) (this repeating unit is appropriately referred to hereinbelow as a "carbonate component") may be used. The carbonate for use may consist of one species of repeating unit or a combination of two or more species of repeating units at any ratio. The polycarbonate may also be a copolymer including a repeating unit other than the carbonate component. When the polycarbonate is a copolymer, the polycarbonate may be a random copolymer, a block copolymer, or a graft copolymer. However, even when the polycarbonate contains a repeating unit other than the carbonate component, it is preferable that the polymer has high containing ratio of the carbonate component. More specifically, the ratio is preferably equal to or larger than 80% by weight, more preferably equal to or larger than 85% by weight, and ideally 100% by weight.

Examples of the polycarbonate may include bisphenol A polycarbonate, branched bisphenol A polycarbonate, and o,o,o',o'-tetramethyl bisphenol A polycarbonate.

The resin having a positive intrinsic birefringence value may contain a component other than the polymer, so long as the effects of the present invention are not significantly impaired. For example, the resin having a positive intrinsic birefringence value may contain an additive. Examples of the additive may include antifriction agents; layered crystalline compounds; inorganic fine particles; stabilizers such as antioxidants, thermal stabilizers, light stabilizers, weathering stabilizers, ultraviolet absorbers and near-infrared absorbers; plasticizers: coloring agents such as dyes and pigments; and antistatic agents. Of these, antifriction agents and ultraviolet absorbers are preferred because they can improve flexibility and weather resistance. As the additives, one species thereof may be used alone, or two or more species thereof may be used in combination at any ratio. The amount of the additive may be appropriately determined within the range in which the effects of the present invention are not significantly impaired. For example, the amount may be set within the range in which a phase difference film obtained by removing the C layer from the phase difference film layered body of the present invention can maintain a total light transmittance of 80% or higher, wherein the transmittance is a converted value for the film having a thickness of 1 mm.

Examples of the antifriction agents may include: inorganic particles of, e.g., silicon dioxide, titanium dioxide, magnesium oxide, calcium carbonate, magnesium carbonate, barium sulfate, and strontium sulfate; and organic particles of, e.g., polymethyl acrylate, polymethyl methacrylate, polyacrylonitrile, polystyrene, cellulose acetate, and cellulose acetate propionate. Of these, organic particles are preferred as the antifriction agents.

Examples of the ultraviolet absorber may include oxybenzophenone-based compounds, benzotriazole-based compounds, salicylate ester-based compounds, benzophenone-based ultraviolet absorbers, benzotriazole-based ultraviolet absorbers, acrylonitrile-based ultraviolet absorbers, triazine-based compounds, nickel complex salt-based compounds, and inorganic powders. Preferred examples of the ultraviolet absorber may include 2,2'-methylenebis(4-(1,1,3,3-tetramethylbutyl)-6-(2H-benzotriazole-2-yl)phenol), 2-(2'-hydroxy-3'-tert-butyl-5'-methylphenyl)-5-chlorobenzotriazole, 2,4-di-tert-butyl-6-(5-chlorobenzotriazole-2-yl)phenol, 2,2'-dihydroxy-4,4'-dimethoxybenzophenone, and 2,2',4,4'-tetrahydroxybenzophenone. Particularly preferred examples may include 2,2'-methylenebis(4-(1,1,3,3-tetramethylbutyl)-6-(2H-benzotriazole-2-yl)phenol).

The glass transition temperature $Tg_A$ of the resin having a positive intrinsic birefringence value is usually equal to or higher than 80° C., preferably equal to or higher than 90° C., more preferably equal to or higher than 100° C., still more preferably equal to or higher than 110° C., and particularly preferably equal to or higher than 120° C. When the resin has such a high glass transition temperature $Tg_A$, the relaxation of the orientation of the resin having a positive intrinsic birefringence value can be reduced. Although no particular limitation is imposed on the upper limit of the glass transition temperature $Tg_A$, the upper limit is usually equal to or lower than 200° C.

The rupture elongation of the resin having a positive intrinsic birefringence value at the glass transition temperature $Tg_B$ of the resin having a negative intrinsic birefringence value that forms the B layer is preferably equal to or higher than 50% and more preferably equal to or higher than 80%. When the rupture elongation falls within this range, the phase difference film layered body of the present invention can be stably produced by stretching. The rupture elongation is determined using a type 1B test piece described in JIS K 7127 at a tensile rate of 100 mm/min.

The A layer in the phase difference film layered body of the present invention usually has a predetermined refractive index caused by the orientation of the resin having a positive intrinsic birefringence value. In the phase difference film obtained by removing the C layer from the phase difference film layered body of the present invention, the retardation of the A layer that is expressed by the refractive index anisotropy of the A layer and the retardation expressed in the B layer are combined to generate the retardation of the entire phase difference film. Therefore, the thickness of the A layer may be set to a suitable value in accordance with the specific retardation to be expressed in the phase difference film.

Usually, the A layer is disposed so as to be exposed at one of the main surfaces of the phase difference film layered body of the present invention. That is, the A layer usually serves as one of the outermost layers of the phase difference film layered body of the present invention. Even though the A layer is exposed in this manner, the A layer is unlikely to be damaged during handling because of its high strength, so that the handling capability is not reduced.

Two or more A layers may be provided. However, from the viewpoint of simplifying the control of retardation and from the viewpoint of reducing the thickness of the phase difference film layered body of the present invention, it is preferable to provide only one A layer.

[1-2. B Layer]

The B layer consists of a resin having a negative intrinsic birefringence value. The resin having a negative intrinsic birefringence value contains a styrene polymer and, if necessary, an optional component.

The styrene polymer is a polymer having a repeating unit derived from a styrene monomer. The styrene monomer is any of styrene and styrene derivatives. Examples of the styrene derivatives may include α-methylstyrene, o-methylstyrene, p-methylstyrene, p-chlorostyrene, p-nitrostyrene, p-aminostyrene, p-carboxystyrene, and p-phenylstyrene. As the styrene monomer, one species thereof may be used alone, or two or more species thereof may be used in combination at any ratio.

The styrene polymer may be a homopolymer consisting solely of a styrene monomer or a copolymer consisting of styrene monomers or may be a copolymer of a styrene monomer and an optional monomer. Examples of the optional monomer copolymerizable with the styrene monomer may include ethylene, propylene, butadiene, isoprene, acrylonitrile, methacrylonitrile, α-chloroacrylonitrile, N-phenylmaleimide, methyl acrylate, methyl methacrylate, ethyl acrylate, ethyl methacrylate, acrylic acid, methacrylic acid, maleic anhydride, and vinyl acetate. As the optional monomer, one species thereof may be used alone, or two or more species thereof may be used in combination at any ratio. The specific amount of the optional monomer is, e.g., preferably equal to or lower than 30 parts by weight, more preferably equal to or lower than 28 parts by weight, and still more preferably equal to or lower than 26 parts by weight based on 100 parts by weight of the styrene polymer. Therefore, the amount of the repeating unit derived from the styrene monomer that 100 parts by weight of the styrene polymer contains is preferably equal to or larger than 70 parts by weight, more preferably equal to or larger than 72 parts by weight, and still more preferably equal to or larger than 74 parts by weight, and usually equal to or lower than 100 parts by weight.

Of the aforementioned polymers, a copolymer of a styrene monomer and maleic anhydride is particularly preferable because of its high heat resistance. As the styrene polymer, one species thereof may be used alone, or two or more species thereof may be used in combination at any ratio.

The resin having a negative intrinsic birefringence value may contain a component other than the styrene polymer, so long as the effects of the present invention are not significantly impaired. For example, the resin having a negative intrinsic birefringence value may contain an optional polymer other than the styrene polymer. From the viewpoint of setting the intrinsic birefringence value of the resin constituting the B layer to be negative, the optional polymer is preferably a polymer having a negative intrinsic birefringence value. Specific examples thereof may include polyacrylonitrile, polymethyl methacrylate, cellulose esters, and multi-component copolymers thereof. The component of the optional polymer may be contained in part of the styrene polymer as a repeating unit. In order to achieve the advantages of the present invention remarkably, it is preferable that the amount of the optional polymer in the B layer is low. The specific amount of the optional polymer is, e.g., preferably lower than 50 parts by weight and more preferably lower than 45 parts by weight with respect to 100 parts by weight of the styrene polymer. Particularly preferably, no optional polymer is contained.

The resin having a negative intrinsic birefringence value may contain, e.g., an additive. Examples of the additive may be those that are the same as the examples of the additive that may be contained in the resin having a positive intrinsic birefringence value. As the additive, one species thereof may be used alone, or two or more species thereof may be used in combination at any ratio. The amount of the additive may be appropriately set within the range in which the effects of the present invention are not significantly impaired. For example, the amount may be set within the range in which a phase difference film obtained by removing the C layer from the phase difference film layered body of the present invention can maintain a total light transmittance of 80% or higher, wherein the transmittance is a converted value for the film having a thickness of 1 mm.

The glass transition temperature $Tg_B$ of the resin having a negative intrinsic birefringence value is usually equal to or higher than 80° C., preferably equal to or higher than 90° C., more preferably equal to or higher than 100° C., still more preferably equal to or higher than 110° C., and particularly preferably equal to or higher than 120° C. When the resin has such a high glass transition temperature $Tg_B$, the relaxation of the orientation of the resin having a negative intrinsic birefringence value can be reduced. Although no particular limitation is imposed on the upper limit of the glass transition temperature $Tg_B$, the upper limit is usually equal to or lower than 200° C.

The rupture elongation of the resin having a negative intrinsic birefringence value at the glass transition temperature $Tg_A$ of the resin having a positive intrinsic birefringence value is preferably equal to or higher than 50% and more preferably equal to or higher than 80%. Although no particular limitation is imposed on the upper limit of the rupture elongation of the resin having a negative intrinsic birefringence value, the upper limit is usually equal to or lower than 200%. When the rupture elongation falls within this range, the phase difference film layered body of the present invention can be stably produced by stretching.

The absolute value of the difference between the glass transition temperature $Tg_A$ of the resin having a positive intrinsic birefringence value and the glass transition temperature $Tg_B$ of the resin having a negative intrinsic birefringence value is preferably larger than 5° C. and more preferably equal to or larger than 8° C., and preferably equal to or lower than 40° C. and more preferably equal to or lower than 20° C. If the absolute value of the difference in glass transition temperature is too small, the temperature dependence of the retardation expression tends to become small. If the absolute value of the difference in glass transition temperature is too large, stretching of the resin having a higher glass transition temperature may become difficult, and the flatness of the phase difference film may be deteriorated. Preferably, the glass transition temperature $Tg_A$ is higher than the glass transition temperature $Tg_B$. Therefore, it is usually preferable that the resin having a positive intrinsic birefringence value and the resin having a negative intrinsic birefringence value satisfy the relationship of $Tg_A > Tg_B + 5°$ C.

The B layer in the phase difference film layered body of the present invention usually has predetermined refractive index anisotropy caused by the orientation of the resin having a negative intrinsic birefringence value. In the phase difference film obtained by removing the C layer from the phase difference film layered body of the present invention, the retardation of the B layer that is expressed by the refractive index anisotropy of the B layer and the retardation expressed in the A layer are combined to generate the retardation of the entire phase difference film. Therefore, the thickness of the B layer may be set to a suitable value in accordance with the specific retardation to be expressed in the phase difference film.

Usually, the A layer and the B layer are in direct contact with each other with no other layer interposed therebetween. However, the A layer and the B layer may be indirectly contact with each other via a layer such as an adhesive layer, so long as the effects of the present invention are not significantly impaired.

Two or more B layers may be provided. However, from the viewpoint of simplifying the control of retardation and from the viewpoint of reducing the thickness of the phase difference film layered body of the present invention, it is preferable to provide only one B layer.

[1-3. C Layer]

The C layer consists of a resin containing a polymer having an alicyclic structure. The polymer having an alicyclic structure is a polymer having the alicyclic structure on one or both of its main chain and side chain. The resin containing the polymer having an alicyclic structure is excellent in transparency, size stability etc. and has low hygroscopicity, light weight, etc. Therefore, by protecting the B layer with the C layer, damage to the B layer etc. can be stably prevented. The resin containing the polymer having an alicyclic structure has high flexibility. Therefore, the impact resistance of the phase difference film layered body of the present invention can also be improved. Usually, since the resin containing the polymer having an alicyclic structure has low compatibility with the styrene polymer, the adhesion force between the B layer and the C layer is also low. Therefore, the C layer can be easily removed from the B layer, so that, when the C layer is removed from the phase difference film layered body of the present invention to produce the phase difference film, damage to the B layer caused by the removal of the C layer can be stably prevented.

Of the aforementioned polymers having an alicyclic structure, a polymer having an alicyclic structure on its main chain is preferred from the viewpoint of mechanical strength and heat resistance.

Examples of the alicyclic structure may include a saturated alicyclic hydrocarbon (cycloalkane) structure and an unsaturated alicyclic hydrocarbon (cycloalkene) structure. From the viewpoint of mechanical strength and heat resistance, a cycloalkane structure is preferred.

No particular limitation is imposed on the number of carbon atoms constituting the alicyclic structure. However, the number of carbon atoms is usually equal to or larger than 4 and preferably equal to or larger than 5, and usually equal to or smaller than 30, preferably equal to or smaller than 20, and more preferably equal to or smaller than 15. The aforementioned range is preferred because thereby mechanical strength, heat resistance, and the moldability of the substrate are highly balanced.

The ratio of the repeating unit having the alicyclic structure in the polymer having the alicyclic structure is preferably equal to or larger than 55% by weight, more preferably equal to or larger than 70% by weight, and particularly preferably equal to or larger than 90% by weight, and is usually equal to or lower than 100% by weight. The ratio of the repeating unit having the alicyclic structure in the polymer having the alicyclic structure falling within the aforementioned range is preferred from the viewpoint of transparency and heat resistance.

Examples of the polymer having the alicyclic structure may include norbornene-based polymers, monocyclic olefin-based polymers, cyclic conjugated diene-based polymers, vinyl alicyclic hydrocarbon-based polymers, and hydrogenated products thereof. Of these, norbornene-based polymers may be preferably used because of their high transparency and moldability.

The norbornene-based polymer is a polymer made of a monomer having a norbornene structure (referred to hereinbelow as a norbornene-based monomer) or a copolymer of a norbornene-based monomer and another optional monomer. Specific examples of the norbornene-based polymer may include: a ring-opening polymer of norbornene-based monomers, a ring-opening copolymer of norbornene-based monomers and optional monomers, and hydrogenated products thereof; and an addition polymer of norbornene-based monomers, an addition copolymer of norbornene-based monomers and optional monomers, and hydrogenated products thereof. Of these, hydrogenated products of ring-opening (co)polymers of norbornene-based monomers may be particularly preferably used from the viewpoint of, e.g., transparency, moldability, heat resistance, low hygroscopicity, size stability, and light weight. The term "(co)polymer-" means polymer- and copolymer-.

Examples of the norbornene-based monomers may include bicyclo[2.2.1]hept-2-ene (trivial name: norbornene), tricyclo[4.3.0.1$^{2,5}$]deca-3,7-diene (trivial name: dicyclopentadiene), 7,8-benzotricyclo[4.3.0.1$^{2,5}$]deca-3-ene (trivial name: methanotetrahydrofluorene), tetracyclo[4.4.0.1$^{2,5}$.1$^{7,10}$]dodeca-3-ene (trivial name: tetracyclododecene), and derivatives of these compounds (e.g., compounds having substituents on their rings). As the norbornene-based monomer, one species thereof may be used alone, or two or more species thereof may be used in combination at any ratio.

Examples of the substituents that the monomers having the norbornene structure may have may include alkyl groups, alkylene groups, and polar groups. The number of types of the substituents may be one or two or more. The number of substituents per one monomer may be one or two or more. Examples of the type of the polar group may include heteroatoms and atomic groups having heteroatoms. Examples of the heteroatoms may include an oxygen atom, a nitrogen atom, a sulfur atom, a silicon atom, and halogen atoms. Specific examples of the polar group may include a carboxyl group, a carbonyloxycarbonyl group, an epoxy group, a hydroxyl group, an oxy group, an ester group, a silanol group, a silyl group, an amino group, a nitrile group, and a sulfone group. In order to obtain a phase difference film layered body having low moisture permeability, it is preferable that the polymer has a small amount of the polar group, and it is more preferable that the polymer has no polar group.

Examples of the optional monomers that are ring-opening copolymerizable with the norbornene-based monomers may include: monocyclic olefins such as cyclohexene, cycloheptene, and cyclooctene and derivatives thereof; and cyclic conjugated dienes such as cyclohexadiene and cycloheptadiene and derivatives thereof. One species of these monomers may be used alone, or two or more species thereof may be used in combination at any ratio.

The ring-opening polymers of the norbornene-based monomers and the ring-opening copolymers of the norbornene-based monomers and the optional monomers copolymerizable therewith may be obtained by; e.g., (co)polymerization of the monomers in the presence of a publicly known ring-opening polymerization catalyst.

Examples of the optional monomers that are addition-copolymerizable with the norbornene-based monomers may include: α-olefins having 2 to 20 carbon atoms such as ethylene, propylene, and 1-butene and derivatives thereof; cycloolefins such as cyclobutene, cyclopentene, and cyclohexene, and derivatives thereof; and non-conjugated dienes such as 1,4-hexadiene, 4-methyl-1,4-hexadiene, and 5-methyl-1,4-hexadiene. Of these, α-olefins are preferred, and ethylene is more preferred. One species of these monomers may be used alone, or two or more species thereof may be used in combination at any ratio.

The addition polymers of the norbornene-based monomers and the addition copolymers of the norbornene-based monomers and the optional monomers copolymerizable therewith may be obtained by, e.g., polymerization of the monomers in the presence of a publicly known addition polymerization catalyst.

Of the aforementioned norbornene-based polymers, preferred is a polymer including as repeating units X: bicyclo[3.3.0]octane-2,4-diyl-ethylene structure and Y: tricyclo[4.3.0.1$^{2,5}$]decane-7,9-diyl-ethylene structure, wherein the amount of the repeating units X and Y with respect to the total amount of the repeating units in the norbornene-based polymer is equal to or larger than 90% by weight, and the ratio of the amount of X relative to the amount of Y, i.e., the weight ratio X:Y, is 100:0 to 40:60. By using such a polymer, it is possible to obtain a phase difference film layered body that does not cause long-term size changes and has excellent stability of optical properties.

As the polymer having an alicyclic structure, one species thereof may be used alone, or two or more species thereof may be used in combination at any ratio.

The molecular weight of the polymer having an alicyclic structure in terms of the weight-average molecular weight (Mw) is usually equal to or higher than 10,000, preferably equal to or higher than 15,000, and more preferably equal to or higher than 20,000, and usually equal to or lower than 100,000, preferably equal to or lower than 80,000, and more preferably equal to or lower than 50,000. The weight-average molecular weight Mw falling within the aforementioned range is preferred because thereby the mechanical strength and moldability of the phase difference film layered body of the present invention are highly balanced. In addition, easily removal of the layer from the phase difference film layered body of the present invention is thereby enabled. The weight-average molecular weight is a converted value in terms of polyisoprene or polystyrene weight-average molecular weight measured by gel permeation chromatography using cyclohexane as a solvent. When the polymer does not dissolve in cyclohexane, toluene may be used as the solvent.

Preferably, the resin containing the polymer having an alicyclic structure contains particles. When the resin containing the polymer having an alicyclic structure contains particles, concavity and convexity are formed on the surface of the C layer, so that the contact area on the surface of the C layer is reduced. Therefore, the slidability of the surface of the C layer can be improved, which enables improvement in the handling capability of the phase difference film layered body of the present invention.

The particles for use may be any of inorganic particles and organic particles. Examples of the material of the inorganic particles may include: inorganic oxides such as silica, titania, alumina, and zirconia; calcium carbonate; talc; clay; fired kaolin; fired calcium silicate; calcium silicate hydrate; aluminum silicate; magnesium silicate; and calcium phosphate. Examples of the material of the organic particles may include silicone resins, fluorine resins, and (meth)acrylic resins. One species of them may be used alone, or two or more species thereof may be used in combination at any ratio.

Of these, silica is preferred. This is because silica particles have high transparency, have small tendency to cause haze, and do not cause coloration, so that the appearance of the phase difference film layered body of the present invention can be maintained in good state. In addition, such silica particles have good dispersibility and good dispersion stability in the resin containing the polymer having an alicyclic structure.

The average primary particle diameter of the particles is usually equal to or larger than 0.1 μm, preferably equal to or larger than 0.2 μm, and more preferably equal to or larger than 0.3 μm, and usually equal to or smaller than 1.0 μm, preferably equal to or smaller than 0.9 μm, and more preferably equal to or smaller than 0.8 μm. The average primary particle diameter of the particles may be measured as a particle diameter at which the cumulative volume calculated from the small-diameter side in a particle size distribution measured by a laser diffraction method reaches 50% (median diameter D50).

The amount of the particles contained in the resin containing the polymer having an alicyclic structure is usually equal to or larger than 0.1 parts by weight and preferably equal to or larger than 1 part by weight and is usually equal to or lower than 5 parts by weight and preferably equal to or lower than 3 parts by weight, based on 100 parts by weight of the polymer having the alicyclic structure.

The thermal weight loss rate of the particles in a $N_2$ atmosphere at usually equal to or higher than 180° C., preferably equal to or higher than 200° C., and more preferably equal to or higher than 250° C., and usually equal to or lower than 300° C. is equal to or lower than 0.3%. Use of such particles with high thermal weight loss temperature can prevent bubble formation due to the particles during extrusion molding of the resin containing the polymer having an alicyclic structure, so that formation of low-strength portions starting from the bubbles can be prevented.

If necessary, the resin containing the polymer having an alicyclic structure may further contain, in addition to the polymer having an alicyclic structure and the particles, an optional component. For example, the polymer having an alicyclic structure may contain a polymer that does not have an alicyclic structure. However, it is preferable that the amount of the polymer that does not have an alicyclic structure is set within the range in which the effects of the present invention are not significantly impaired. More specifically, this amount is usually equal to or lower than 50 parts by weight and preferably equal to or lower than 30 parts by weight with respect to 100 parts by weight of the polymer having an alicyclic structure.

The resin containing the polymer having an alicyclic structure may further contain, e.g., an additive. Examples of the additive may be those that are the same as the examples of the additive that may be contained in the resin having a positive intrinsic birefringence value. As the additive, one species thereof may be used alone, or two or more species thereof may be used in combination at any ratio. The amount of the additive may be appropriately set within the range in which the effects of the present invention are not significantly impaired. For example, the amount may be set within the range in which the phase difference film layered body of the present invention can maintain a total light transmittance of 80% or higher, wherein the transmittance is a converted value for the film having a thickness of 1 mm.

The glass transition temperature of the resin containing the polymer having an alicyclic structure is usually equal to or higher than 130° C., preferably equal to or higher than 135° C., and more preferably equal to or higher than 138° C. When the resin has such a high glass transition temperature, the linear expansion coefficient of the C layer can be reduced, so that the deformation of the phase difference film layered body of the present invention by heat can be prevented. The upper limit of the glass transition temperature of the resin containing the polymer having an alicyclic structure is usually equal to or lower than 200° C., preferably equal to or lower than 180° C., and more preferably equal to or lower than 170° C. When the glass transition temperature falls within the aforementioned range, a resin suitable for molding can be obtained.

Examples of the trade name of the aforementioned resin containing the polymer having an alicyclic structure may include ZEONOR (manufactured by ZEON CORPORATION), ARTON (manufactured by JSR Corporation), APEL (manufactured by Mitsui Chemicals, Inc.), and TOPAS (manufactured by Topas Advanced Polymers).

In the process of producing the phase difference film layered body of the present invention, the C layer is usually stretched together with the A layer and the B layer. Therefore, the C layer may possibly express retardation. No particular limitation is imposed on the retardation in the C layer that is expressed during stretching. For example, if the C layer is used as an optical film after removal of the C layer from the phase difference film layered body of the present invention, the C layer may be formed so as to express the retardation required for the optical film.

The thickness of the C layer is usually equal to or larger than 0.5 μm, preferably equal to or larger than 1 μm, and more preferably equal to or larger than 2 μm from the viewpoint of providing practical strength to the phase difference film layered body of the present invention, and is usually equal to or smaller than 20 μm, preferably equal to or smaller than 18 μm, and more preferably equal to or smaller than 15 μm from the viewpoint of stably preventing curling.

The C layer is disposed in the phase difference film layered body of the present invention such that the A layer, the B layer, and the C layer are arranged in this order. Usually, the B layer and the C Layer are in direct contact with each other with no other layer interposed therebetween. This is for utilizing low adhesion between the B layer and the C layer for realizing easy removal of the C layer from the phase difference film layered body of the present invention.

Two or more C layers may be provided. However, from the viewpoint of reducing the thickness of the phase difference film of the present invention, it is preferable to provide only one C layer.

If necessary, the surface of the C layer may be further roughened. By subjecting the surface of the C layer to a roughening treatment, its adhesion to another film when the C layer is bonded thereto can be improved. Examples of the means for roughening the surface may include a corona discharge treatment, embossing, sandblasting, etching, and attachment of fine particles.

[1-4. Other Layers]

In addition to the A layer, the B layer, and the C layer, an additional layer may be provided in the phase difference film layered body of the present invention, so long as the effects of the present invention are not significantly impaired.

For example, an adhesive layer may be provided between the A layer and the B layer. The adhesive layer may be formed from an adhesive that is compatible with both the A layer and the B layer to be bonded. Examples of the adhesive may include: ethylene-(meth)acrylate copolymers such as ethylene-methyl (meth)acrylate copolymers, and ethylene-ethyl (meth)acrylate copolymers; ethylene-based copolymers such as ethylene-vinyl acetate copolymers and ethylene-styrene copolymers; and other olefin-based polymers. In addition, modified products obtained by modifying these polymers by, e.g., oxidation, saponification, chlorination, and chloro-sulfonation may also be used. As the adhesive, one species thereof may be used alone, or two or more species thereof may be used in combination at any ratio.

The thickness of the adhesive layer is preferably equal to or larger than 1 μm and more preferably equal to or larger than 2 and preferably equal to or smaller than 50 μm and more preferably equal to or smaller than 30 μm.

The glass transition temperature $Tg_B$ of the adhesive is preferably lower than the aforementioned $Tg_A$ and $Tg_B$ and more preferably lower by 15° C. or more than $Tg_A$ and $Tg_B$. This is for preventing expression of retardation due to stretching in the adhesive layer so that the retardation of the phase difference film can be easily controlled.

The phase difference film layered body of the present invention may further include, on its surface, e.g., a mat layer for improving the slidability of the film, a hard coating layer, an anti-reflection layer, and an anti-fouling layer.

[1-5. Other Matters Regarding Phase Difference Film Layered Body]

In the phase difference film layered body of the present invention, a layer portion of the layered body that is a portion thereof other than the C layer has retardation Re at an incident angle of 0° and retardation $R_{40}$ at an incident angle of 40° wherein they satisfy the relationship of $0.92 \leq R_{40}/Re \leq 1.08$. $R_{40}/Re$ is preferably equal to or larger than 0.95, and preferably equal to or smaller than 1.05. When the phase difference film obtained by removing the C layer from the phase difference film layered body of the present invention is applied to a display device such as a liquid crystal display device, since Re and $R_{40}$ satisfy the aforementioned relationship, the angular dependence of the displayed color tone on the device can be favorably reduced. The incident angle of 0° represents the normal direction to the phase difference film, and the incident angle of 40° is an angle that inclines by 40° with respect to the normal direction to the phase difference film. No particular limitation is imposed on the inclination direction of the observation angle upon measuring $R_{40}$, and it is sufficient that the value of $R_{40}$ at any one inclination angle satisfies the aforementioned requirement.

The wavelength for comparing retardations Re and $R_{40}$ may be any wavelength in the visible light range and may preferably be 590 nm.

The retardations Re and $R_{40}$ at the incident angles of 0° and 40° may be measured by a parallel Nicols rotation method using KOBRA-WR manufactured by Oji Scientific Instruments. When Re and $R_{40}$ satisfy the aforementioned relationship, the refractive indices nx and ny in the in-plane principal axis directions and the refractive index nz in the thickness direction of the phase difference film can satisfy nx>nz>ny. The refractive indices nx, nz, and ny are the weighted average refractive indices $n_{ave}$ in each direction in the respective layers that are contained in the layer portion of the phase difference film layered body of the present invention that is a portion thereof other than the C layer. These indices are determined by the following formula:

$$n_{ave}=\Sigma(ni \times Li)/\Sigma Li$$

where ni is the refractive index of an i-th layer, and Li is the thickness of the i-th layer.

The phase difference film obtained by removing the C layer from the phase difference film layered body of the present invention includes the A layer and the B layer. Since the A layer and the B layer have the desired optical properties, the phase difference film has the desired optical properties.

In the phase difference film layered body of the present invention, the B layer is sandwiched between the A layer and the C layer to protect the B layer. Therefore, even though the B layer has low strength, the entire phase difference film layered body of the present invention has high strength. Thus, the damage on the B layer during handling is reduced, and the handling capability of the phase difference film layered body of the present invention can be improved.

The resin forming the C layer contains the polymer having an alicyclic structure, and this polymer has high strength and flexibility. Therefore, the phase difference film layered body of the present invention has higher flexibility than, e.g., a three-layer structure phase difference film in which the B layer is sandwiched between a pair of A layers. Accordingly, the phase difference film layered body of the present invention has high impact resistance. The effects of the high flexibility and impact resistance also contribute to improvement in the handling capability of the phase difference film layered body of the present invention.

The C layer is removed from the phase difference film layered body of the present invention upon using as a phase difference film. Therefore, the retardation expressed in the C layer has no influence on the retardation of the phase difference film. Thus, expression of the retardation in the phase difference film is expressed by the combination of the A layer and the B layer. In order to meet the aforementioned relationship between Re and $R_{40}$, the thickness of the A layer and the thickness of the B layer are appropriately controlled. For example, when the phase difference film of the present invention is produced by the production method which will be described later, the ratio of the thickness of the A layer to the thickness of the B layer may be determined in accordance with the ability of each layer to express phase difference by stretching. In this case, by increasing the thickness of the layer having low ability to express phase difference, the phase difference film of the present invention satisfying the aforementioned relationship between Re and $R_{40}$ can be obtained. In the phase difference film of the present invention, the retardation Re at the incident angle of 0° at the wavelength of 590 nm is preferably equal to or larger than 50 nm and more preferably equal to or larger than 100 nm, and preferably equal to or smaller than 400 nm and more preferably equal to or smaller than 350 nm. The phase difference film layered body of the present invention essentially has at least one A layer and at least one B layer, whereby control of retardation is simplified and thickness of the phase difference film can be reduced.

When the resin forming the C layer contains particles, fine concavity and convexity are formed on the surface of the C layer. Therefore, the surface roughness of the C layer becomes large, and the slidability of the surface of the C layer is thereby improved. This also contributes to improvement in handling capability of the phase difference film of the present invention.

[2. Phase Difference Film]

By removing the C layer from the phase difference film layered body of the present invention, a phase difference film including the A layer and the B layer is obtained. Since the adhesion between the B layer and the C layer is weak, the removal can be easily performed. In this manner, the C layer covers strength, flexibility, handling capability, etc. during production, conveyance, and storage. Upon using, the C layer is removed. Therefore, the phase difference film can have a reduced thickness, and control of the retardation can be simplified. No particular limitation is imposed on the method for removing the C layer, and any publicly known method for removing a protective film from an optical film may be employed. For example, the following method may be used. The phase difference film layered body of the present invention is wound into a roll shape, and a winder for winding up the C layer is provided at the downstream of the roll. When the phase difference film layered body is unrolled, the winder is rotated in a direction reverse to the rotation direction of the roll, whereby the C layer is wound up while the phase difference film is unrolled.

By removing the C layer from the phase difference film layered body of the present invention, a phase difference film is obtained. The phase difference film has a retardation Re at the incident angle of 0° and a retardation $R_{40}$ at the incident angle of 40° satisfying the relationship of $0.92 \leq R_{40}/Re \leq 1.08$. When the phase difference film is applied to a display device such as a liquid crystal display, since Re and $R_{40}$ satisfy the aforementioned relationship, the angular dependence of the displayed color tone on the device can be particularly favorably reduced as described above.

From the viewpoint of stably exerting the functions as an optical member, the phase difference film has a total light transmittance of preferably 85% or higher. The light transmittance may be measured using a spectrophotometer (ultraviolet-visible-near-infrared spectrophotometer "V 570", manufactured by JACSO Corporation) in accordance with JIS K0115.

The haze of the phase difference film is preferably equal to or lower than 5%, more preferably equal to or lower than 3%, and particularly preferably equal to or lower than 1%. When the haze is at a low value, the clarity of an image displayed on a display device in which the phase difference film is installed can be increased. The haze herein is obtained by measuring haze at five locations using a "Haze meter NDH-300A" manufactured by Nippon Denshoku Industries Co., Ltd. in accordance with JIS K7361-1997, and calculating an average value therefrom.

The phase difference film has a ΔYI of preferably equal to or lower than 5 and more preferably equal to or lower than 3. When the ΔYI is within the aforementioned range, the phase difference film is not colored and has good visibility. The ΔYI is measured using a "spectrophotometer SE2000" manufactured by NIPPON DENSHOKU INDUSTRIES Co., Ltd. in accordance with ASTM E313. The measurement is repeated five times, and the arithmetic average of the measurements is determined.

In the phase difference film, thickness variations of the A layer and the B layer in the entire surface are preferably equal to or smaller than 1 μm. By having such a small variation, unevenness in the color tone of a display device provided with the phase difference film can be reduced. In addition, changes in the color tone of the phase difference film after long-term use can be made uniform. In order to achieve this, the layer consisting of the resin having a positive intrinsic birefringence value and the layer consisting of the resin having a negative intrinsic birefringence value in the pre-stretch film which will be described later are formed such that thickness variations in their entire surface are equal to or smaller than 1 μm.

The phase difference film may shrink in an MD direction (machine direction) and a TD direction (traverse direction) during heat treatment at 60°C. and 90% RH for 100 hours, but the shrinkage ratio is preferably equal to or lower than 0.5% and more preferably equal to or lower than 0.3%. By having such a small shrinkage ratio, the phase difference film can be prevented from being deformed by shrinkage stress even in a high-temperature and high-humidity environment and therefore the phase difference film can be prevented from coming off the display device. The MD direction is a direction of the flow of the film in a production line. The MD direction is usually the same as the lengthwise direction of a long-length film and is also referred to as a longitudinal direction. The TD direction is a direction parallel to the surface of the film and orthogonal to the MD direction. The TD direction is usually referred to as a crosswise direction or a width direction.

The size of the phase difference film in its TD direction may be, e.g., 1,000 mm to 2,000 mm. No limitation is imposed on the size of the phase difference film in its MD direction, but the phase difference film is preferably a long-length film. The "long-length" film herein means a film having a length equal to or greater than five times its width, and preferably having a length equal to or greater than ten times its width. Specifically the "long-length" film means a film having a length such that the film is capable of being wound up into a roll shape for storage and transportation.

The thickness of the phase difference film may be set in accordance with the degree of retardation to be expressed and is preferably equal to or larger than 10 μm and more preferably equal to or larger than 30 μm, and preferably equal to or smaller than 100 μm and more preferably equal to or smaller than 80 μm.

[3. Method for Producing Phase Difference Film Layered Body]

No particular limitation is imposed on the method for producing the phase difference film layered body of the present invention. Usually, the phase difference film layered body of the present invention is produced by preparing a pre-stretch film (a pre-stretch film preparing step), subjecting the prepared pre-stretch film to a uniaxial stretching treatment in one direction at a predetermined temperature (a first stretching step), and then subjecting the resultant film to a uniaxial stretching treatment at a predetermined temperature in a direction orthogonal to the direction in which the aforementioned uniaxial stretching treatment was performed (a second stretching step). This producing method will be described in detail.

[3-1. Pre-stretch Film Preparing Step]

The phase difference film layered body of the present invention is produced by subjecting the pre-stretch film to a stretching treatment. Therefore, the pre-stretch film includes a layer consisting of the resin having a positive intrinsic birefringence value (this layer is appropriately referred to hereinbelow as an "(a) layer"), a layer consisting of the resin containing a styrene polymer and having a negative intrinsic birefringence value (this layer is appropriately referred to hereinbelow as a "(b) layer"), and a layer consisting of the resin containing the polymer having an alicyclic structure (this layer is appropriately referred to hereinbelow as a "(c) layer"), in this order. When the pre-stretch film is subjected to a stretching treatment to form the phase difference film of the present invention, the (a) layer of the aforementioned layers becomes the A layer in the phase difference film layered body of the present invention, the (b) layer becomes the B layer in the phase difference film layered body of the present invention, and the (c) layer becomes the C layer in the phase difference film layered body of the present invention.

However, from the viewpoint of producing a phase difference film having desired phase difference by a stretching treatment, a layer portion of the pre-stretch film according to the present invention that is a portion thereof other than the (c) layer (usually, a layered body including the (a) layer and the (b) layer) satisfies the following requirement. That is, a layer portion that is a portion of the pre-stretch film of the present invention other than the (c) layer causes a phase delay when the pre-stretch film is uniaxially stretched in a direction of an X-axis at a temperature T1 and causes a phase advancement when the pre-stretch film is uniaxially stretched in the direction of the X-axis at a temperature T2 that is different from the temperature T1, the phase delay and the phase advancement being of a phase of linearly polarized light incident perpendicularly on a film surface and having a plane of vibration of an electric vector lying in an XZ plane (this linearly polarized light is appropriately referred to hereinbelow as "XZ polarized light") with respect to a phase of linearly polarized light incident perpendicularly on the film surface and having a plane of vibration of an electric vector lying in a YZ plane (this linearly polarized light is appropriately referred to hereinbelow as "YZ polarized light") wherein the X-axis is a direction of uniaxial stretching, the Y-axis is a direction in a film plane orthogonal to the direction of uniaxial stretching, and the Z-axis is a direction of a thickness of the film.

That is, the pre-stretch film includes the (a) layer consisting of the resin having a positive intrinsic birefringence value and the (b) layer consisting of the resin having a negative intrinsic birefringence value. The pre-stretch film is configured such that, when stretched at different temperatures T1 and T2 at different angles substantially orthogonal to each other, refractive index anisotropy is created in each of the (a) layer and the (b) layer depending on the respective temperatures T1 and T2 and the stretching directions. Accordingly, the refractive index anisotropy created by stretching the (a) layer and the refractive index anisotropy created by stretching the (b) layer are combined, whereby, in the phase difference film including the A layer and the B layer, the retardation Re at the incident angle of 0° and the retardation $R_{40}$ at the incident angle of 40° can satisfy the relationship of $0.92 \leq R_{40}/Re \leq 1.08$ as the entire phase difference film. In this case, refractive index anisotropy may express also in the (c) layer. However, since the C layer obtained by stretching the (c) layer is removed upon using as the phase difference film, the refractive index anisotropy of the C layer has no influence on the refractive index anisotropy of the phase difference film and therefore has no influence on the retardation of the phase difference film.

It is sufficient that the aforementioned requirement (i.e., the requirement that the phase of the XZ polarized light with respect to the YZ polarized light causes a phase delay when uniaxial stretching is performed in the X-axis direction at one of the temperatures T1 and T2 and causes a phase advancement when uniaxial stretching is performed in the X-axis direction at the other one of the temperatures T1 and T2) is satisfied when at least one of various in-plane directions of the pre-stretch film is taken as the X axis. Usually, the pre-stretch film is an isotropic raw film. Therefore, when the aforementioned requirement is met with one in-plane direction taken as the X-direction, the requirement is met with any other directions taken as the X-direction.

In a film in which a slow axis appears along the X axis by uniaxial stretching, the phase of the XZ polarized light usually causes a phase delay with respect to the phase of the YZ polarized light. In contrast, in a film in which a fast axis appears along the X axis by uniaxial stretching, the phase of the XZ polarized light usually causes a phase advancement with respect to the phase of the YZ polarized light. The pre-stretch film according to the present invention is a layered body that utilizes these properties and is a film in which the appearance of the slow axis or fast axis depends on stretching temperature. The temperature dependence of the expression of such refractive index anisotropy and retardation may be controlled by, e.g., adjusting the photoelastic coefficients of the resins in the (a) layer and the (b) layer and the relationship such as the ratio of the thickness of the respective layers.

Retardation is a value determined by multiplying a thickness d by the difference between a refractive index nx in the X-axis direction which is the stretching direction and a refractive index ny in the Y-axis direction which is a direction orthogonal to the stretching direction (the difference: nx–ny). The retardation of a layered body including the A layer and the B layer is synthesized from the retardation of the A layer and the retardation of the B layer. Therefore, in order to, e.g., set the positivity/negativity of the expressed retardation in the entire film by stretching at a higher temperature $T_H$ and that at a lower temperature $T_L$ are in reversed relationship, it is preferable to control the thickness of the (a) layer and the thickness of the (b) layer such that the following (i) and (ii) are satisfied.

(i) By the stretching at the lower temperature $T_L$, the resin having a higher glass transition temperature expresses smaller absolute value of the retardation than the absolute value of the retardation that the resin having a lower glass transition temperature expresses.

(ii) By the stretching at the higher temperature $T_H$, the resin having a lower glass transition temperature expresses smaller absolute value of retardation than the absolute value of the retardation that the resin having a higher glass transition temperature expresses.

In this manner, a pre-stretch film that satisfies the aforementioned requirement (i.e., the requirement that the phase of the XZ polarized light with respect to the YZ polarized light causes a phase delay when uniaxial stretching is performed in the X-axis direction at one of the temperatures T1 and T2 and causes a phase advancement when uniaxial stretching is performed in the X-axis direction at the other one of the temperatures T1 and T2) can be obtained by selecting as the resins constituting the A layer and the B layer a combination of the resins that causes each of the (a) layer and the (b) layer to exhibit a difference between the refractive index in the X-axis direction and the refractive index in the Y-axis direction as a result of stretching in one direction (i.e., uniaxial stretching), and adjusting the thickness of the A layer and the thickness of the B layer with consideration of the stretching conditions.

The temperature T1 is one of $T_H$ and $T_L$, and the temperature T2 is the other one of $T_H$ and $T_L$ that is different from T1.

The retardation expression upon the stretching of the pre-stretch film satisfying the aforementioned requirement will be specifically described with reference to the drawing. FIG. 1 shows an example of the temperature dependence of retardation A when each of the (a) layer and the (b) layer in a pre-stretch film is stretched and an example of the temperature dependence of retardation A when a layer portion of the pre-stretch film that is a portion thereof other than the (c) layer (in this case, the (a) layer+(b) layer) is stretched, where it is assumed that the glass transition temperature $Tg_A$ of a resin forming the (a) layer is higher and the glass transition temperature $Tg_B$ of a resin forming the (b) layer is lower. As shown in FIG. 1, when the layer portion of the pre-stretch film that is a portion thereof other than the (c) layer is stretched at temperature $T_b$, negative retardation expressed in the (b) layer is larger than positive retardation expressed in the (a) layer, so that the (a) layer+the (b) layer expresses negative retardation A. However, when the portion is stretched at temperature $T_a$, the negative retardation expressed in the (b) layer is smaller than the positive retardation expressed in the (a) layer, so that the (a) layer+ the (b) layer expresses positive retardation Δ. Therefore, by the combination of such stretching operations at different temperatures $T_a$ and $T_b$, the retardations generated at the respective temperatures are combined, and a phase difference film having the desired retardation can thereby be realized.

An example of the structure of the pre-stretch film may be as follows. When the resin having a positive intrinsic birefringence value is a resin containing polycarbonate and a resin B is a resin containing a styrene-maleic anhydride copolymer, the ratio of the thickness of the (a) layer relative to the thickness of the (b) layer (the thickness of the (a) layer/the thickness of the (b) layer) is usually equal to or larger than 1/15 and preferably equal to or larger than 1/12, and usually equal to or smaller than 1/5 and preferably equal to or smaller than 1/7. Either when the (a) layer is too thick or when the (b) layer is too thick, the temperature dependence of the retardation expression tends to become small.

The total thickness of the pre-stretch film is preferably equal to or larger than 10 μm, more preferably equal to or larger than 20 μm, and particularly preferably equal to or larger than 30 μm, and preferably equal to or smaller than 500 μm, more preferably equal to or smaller than 200 μm, and particularly preferably equal to or smaller than 150 μm. If the thickness of the pre-stretch film is lower than the lower limit of the aforementioned range, expression of retardation tends to be insufficient, and mechanical strength tends to become weak. If the thickness of the pre-stretch film is larger than the upper limit of the aforementioned range, flexibility can be impaired, and handling may become difficult.

In the pre-stretch film, thickness variations of the (a) layer and the (b) layer in the entire surface are preferably equal to or smaller than 1 μm. By having such a small variation, unevenness in the color tone of the phase difference film can be reduced. In addition, changes in the color tone of the phase difference film after long-term use can be made uniform.

The variations in the thickness of the (a) layer and the thickness of the (b) layer over their entire surface can be reduced to 1 μm or smaller by performing, e.g., any of the following methods: (1) a polymer filter with a mesh of 20 μm or smaller is provided in an extruder; (2) the gear pump is rotated at 5 rpm or faster; (3) enclosing means is provided around the die; (4) the air gap is set to 200 mm or smaller; (5) edge pinning is performed when the film is casted onto the cooling roller; and (6) a twin screw extruder or a single screw extruder having a double flight type screw is used as the extruder.

The thickness of the (a) layer and the (b) layer may be determined as follows. The total thickness of the film is measured using a commercial contact type thickness meter. Then the film is cut at a position at which the thickness was measured, and the cross section thereof is observed under an optical microscope. The ratio of the thickness of the respective layers is determined, and the thickness of the layers are calculated from the determined ratio. This procedure may be repeated on the film at regular intervals in the MD direction and the TD direction, whereby the thickness average values $T_{ave}$ and variations may be determined.

The variations in thickness are calculated from the following formulas using the maximum value $T_{max}$ and minimum value $T_{min}$ of the measured thickness T with reference to the arithmetic average value $T_{ave}$ of the measured values in the aforementioned measurement.

The variations in thickness (μm) is defined as the larger one of $T_{ave}-T_{min}$ and $T_{max}-T_{ave}$.

It is preferable that, when the (c) layer is removed from the pre-stretch film, the total light transmittance, haze, ΔYI, and JIS pencil hardness of the residual portion fall within the same ranges as those defined for the phase difference film. However, the pre-stretch film is for producing the phase difference film by the stretching steps and therefore does not usually have the same retardation as that of the phase difference film.

It is preferable that the outer surface of the pre-stretch film is flat with substantially no irregularly formed linear concave and linear convex portions extending in the MD direction (so-called die lines). The phrase "flat with substantially no irregularly formed linear concave and linear convex portions extending in the MD direction" herein means that, even if linear concave portions and linear convex portions are formed, the linear concave portions have a depth of smaller than 50 nm or a width of larger than 500 nm and the linear convex portions have a height of smaller than 50 nm or a width of larger than 500 nm. More preferably, the linear concave portions have a depth of smaller than 30 nm or a width of larger than 700 nm, and the linear convex portions have a height of smaller than 30 nm or a width of larger than 700 nm. By having such a structure, occurrence of interference of light and light leakage due to refraction of light at the linear concave portions or the linear convex portions can be prevented, so that optical performance can be improved. The phrase "irregularly formed" means that linear concave and convex portions are formed with unintended sizes, unintended shapes, etc. at unintended positions.

The depth of the aforementioned linear concave portions, the height of the aforementioned linear convex portions, and the widths of these portions may be determined by the method as follows. The pre-stretch film is irradiated with light, and the transmitted light is projected onto a screen. Then a portion that produces bright or dark stripes on the screen is cut out with a size of 30-mm square. The portion that produces the bright or dark stripes is a portion having deep linear concave portions or high linear convex portions. The surface of the cut-out film piece is observed under a three-dimensional surface structure analysis microscope (viewing area: 5 mm×7 mm). The observed image is converted into a three-dimensional image, and cross-sectional profiles of the three-dimensional image are determined. The cross-sectional profiles are determined at 1 mm intervals in the viewing area.

An average line is drawn in each cross sectional profile. The length from the average line to the bottom of a linear concave portion is taken as the depth of the linear concave portion, and the length from the average line to the apex of a linear convex portion is taken as the height of the linear convex portion. The distance between intersections of the average line and the profile is taken as the width. Each of the maximum depth value of the linear concave portions and maximum height value of the linear convex portions is determined from the measured values thereof, and the width of each of the linear concave portion and linear convex portion showing the maximum values is determined. The determined maximum depth value of the linear concave portions and the maximum height value of the linear convex portions and the determined widths of the linear concave portion and linear convex portion showing the maximum values are taken as the depth of the linear concave portions in the film, the height of the linear convex portions, and their widths.

No particular limitation is imposed on the method for producing the pre-stretch film of the present invention. Examples of the production method may include: coextrusion methods such as a coextrusion T-die method, a coextrusion inflation method, and a coextrusion lamination method; film lamination forming methods such as dry lamination; a co-flow casting method; and a coating forming method in which the surface of a resin film is coated with a resin solution. Of these, coextrusion methods are preferred from the viewpoint of production efficiency and the viewpoint of eliminating a residual volatile component such as a solvent in the film.

When a coextrusion method is employed, the pre-stretch film may be obtained by, e.g., coextruding the resin having a positive intrinsic birefringence value, the resin containing a styrene polymer and having a negative intrinsic birefringence value, and the resin containing the polymer having an alicyclic structure. Examples of the coextrusion method may include a coextrusion T-die method, a coextrusion inflation method, and a coextrusion lamination method. Of these, the coextrusion T-die method is preferred. Examples of the coextrusion T-die method may include a feed block method and a multi-manifold method. The multi-manifold method is particularly preferred because thereby variations in thickness can be reduced.

When the coextrusion T-die method is employed, the temperature for melting the resins in the extruder having a T-die is set to a temperature higher than the glass transition temperatures of thermoplastic resins used as the aforementioned resins by preferably 80° C. or more and more preferably 100° C. or more, and preferably 180° C. or less and more preferably 150° C. or less. If the temperature for melting in the extruder is excessively low, the flowability of the resins may become insufficient. If the temperature for melting is excessively high, the resins may be deteriorated.

In an extrusion molding method, sheet-shaped molten resins extruded from the openings of dies are brought into tight contact to cooling drums. No particular limitation is imposed on the method for bringing the molten resins into tight contact to the cooling drums. Examples of the method may include an air knife method, a vacuum box method, and an electrostatic contacting method.

No particular limitation is imposed on the number of cooling drums. Usually, the number of cooling drums is two or more. No particular limitation is imposed on the method of arranging the cooling drums and the arrangement may be of linear type, Z type, and L type. No particular limitation is imposed on the manner of passing the molten resins extruded from the openings of the dies between the cooling drums.

The contacting degree of the extruded sheet-shaped resins to the cooling drums varies depending on the temperature of the cooling drums. The contacting becomes tight by increasing the temperature of the cooling drums. However, if the temperature is too high, a problem may occur in that the sheet-shaped resins are not released from the cooling drums and are wound around the drums. Therefore, the temperature of the cooling drums is set preferably within the range of equal to or lower than $(Tg+30)°$ C. and more preferably $(Tg-5)°$ C. to $(Tg-45)°$ C., where Tg is the glass transition temperature of a resin of a layer that is extruded from the die and comes into contact with the drums. In this manner, problems such as sliding and flaws can be prevented.

It is preferable to reduce the amount of the solvent remaining in the pre-stretch film. Examples of the means for reducing the amount of the remaining solvent may include: (1) means to reduce the amount of the solvent remaining in the resins for as the raw materials; and (2) means to pre-drying the resins before the pre-stretch film is molded. The pre-drying is performed using a hot air dryer etc. after the resins are formed into, e.g., a pellet form. The drying temperature is preferably equal to or higher than 100° C., and the drying time is preferably equal to or longer than 2 hours. By performing the pre-drying, the amount of the solvent remaining in the film can be reduced, and occurrence of bubbles in the extruded sheet-shaped resins can be prevented.

The pre-stretch film for use is usually an isotropic raw material film. However, a film that has been subjected to a stretching treatment may be used as the pre-stretch film, and the film may be further subjected to a stretching treatment.

[3-2. First Stretching Step]

In the producing method of the present invention, firstly, the first stretching step is performed in which the pre-stretch film is subjected to a uniaxial stretching treatment in one direction at one of the temperatures T1 and T2. When the stretching is performed at the temperature T1, phase delay of XZ polarized light with respect to the phase of YZ polarized light occurs in the layer portion of the pre-stretch film other than the (c) layer (usually the layered body of the (a) layer and the (b) layer). When the uniaxial stretching is performed at the temperature T2, phase advancement of the XZ polarized light with respect to the phase of the YZ polarized light occurs in the layer portion of the pre-stretch film excluding the (c) layer.

When the glass transition temperatures have relationship of $Tg_A>Tg_B$, the temperature T1 is preferably equal to or higher than $(Tg_B+3°$ C.) and equal to or lower than $(Tg_A+14°$ C.), more preferably equal to or higher than $(Tg_B+5°$ C.) and equal to or lower than $(Tg_A+12°$ C.), still more preferably equal to or higher than $(Tg_B+5°$ C.) and equal to or lower than $(Tg_A+10°$ C.), and particularly preferably equal to or higher than $(Tg_B+5°$ C.) and equal to or lower than $(Tg_A+8°$ C.). The temperature T2 is preferably equal to or lower than $(Tg_B+6°$ C.), more preferably equal to or lower than $(Tg_B+3°$ C.), and still more preferably equal to or lower than $Tg_B$. In this case, it is preferable that the first stretching step is performed at the temperature T1.

When $Tg_B>Tg_A$, the temperature T2 is preferably equal to or higher than $(Tg_A+3°$ C.) and equal to or lower than $(Tg_B+14°$ C.), more preferably equal to or higher than $(Tg_A+5°$ C.) and equal to or lower than $(Tg_B+12°$ C.), still more preferably equal to or higher than $(Tg_A+5°$ C.) and equal to or lower than $(Tg_B+10°$ C.), and particularly preferably equal to or higher than $(Tg_A+5°$ C.) and equal to or lower than $(Tg_B+8°$ C.). The temperature T1 is preferably equal to or lower than $(Tg_A+6°$ C.), more preferably equal to or lower than $(Tg_A+3°$ C.), and still more preferably equal to or lower than $Tg_A$. In this case, it is preferable that the first stretching step is performed at the temperature T2.

When the stretching temperatures T1 and T2 fall within the aforementioned ranges, the refractive indices of the A layer and the B layer can be easily controlled within the desired range.

The uniaxial stretching treatment may be performed by any publicly known method. Examples of such a method may include: a method in which uniaxial stretching is performed in the MD direction by utilizing the difference in peripheral speed between rollers; and a method in which uniaxial stretching is performed in the TD direction using a tenter. Examples of the method for uniaxial stretching in the MD direction may include IR heating between rollers and a float process. Of these, the float process is preferred because a phase difference film with high optical uniformity can be obtained. Examples of the method for uniaxial stretching in the TD direction may include a tenter method.

In the uniaxial stretching treatment, a temperature difference along the TD direction may be present in a stretching zone, in order to reduce stretching unevenness and thickness unevenness. In order to generate a temperature difference in the TD direction in the stretching zone, any publicly known method may be used. For example, the degrees of opening of hot air nozzles are controlled in the TD direction, or IR heaters are arranged in the TD direction to control heating.

[3-3. Second Stretching Step]

After performing the first stretching step, the second stretching step is performed in which a uniaxial stretching treatment is performed in a direction orthogonal to the direction of the uniaxial stretching treatment performed in the first stretching step at one of the temperature T2 and temperature T1 that is different from the temperature in the first stretching step. In the second stretching step, when the relationship between the glass transition temperatures is $Tg_A>Tg_B$, it is preferable to perform the uniaxial stretching treatment at the temperature T2. When $Tg_B>Tg_A$, it is preferable to perform the uniaxial stretching treatment at the temperature T1.

Any of the methods that may be employed for the uniaxial stretching treatment in the first stretching step may be applicable as the method for the uniaxial stretching treatment in the second stretching step. However, it is preferable that the uniaxial stretching treatment in the second stretching step is performed at a stretching ratio that is smaller than that in the uniaxial stretching treatment in the first stretching step. More specifically, a first stretching ratio is preferably 2 to 4 times, and a second stretching ratio is preferably 1.1 to 2 times.

The difference between the temperature T1 and the temperature T2 is usually equal to or larger than 5° C. and preferably equal to or larger than 10° C. By setting such a large difference between the temperature T1 and the temperature T2, the desired retardation can stably be expressed in the phase difference film. No limitation is imposed on the upper limit of the difference between the temperature T1 and the temperature T2, but the difference is equal to or lower than 100° C. from the viewpoint of industrial productivity.

The combination of the stretching direction in the first stretching step and the stretching direction in the second stretching step may be a combination of stretching in the MD direction in the first stretching step and stretching in the TD direction in the second stretching step, a combination of stretching in the TD direction in the first stretching step and stretching in the MD direction in the second stretching step, and a combination of stretching in a diagonal direction in the first stretching step and stretching in a diagonal direction orthogonal to the aforementioned diagonal direction in the second stretching step. Particularly, it is preferable to perform the stretching in the TD direction in the first stretching step and then in the MD direction in the second stretching step. This is because, when the stretching at a small stretching ratio in the second stretching step is performed in the MD direction, unevenness in the direction of the optical axis of the obtained phase difference film can be reduced over its entire width.

By performing the first stretching step and the second stretching step of the pre-stretch film in the aforementioned manner, retardation is generated in the (a) layer and the (b) layer in each of the first stretching step and the second stretching step, depending on the stretching temperatures, stretching directions, stretching ratios, etc. Therefore, in the phase difference film layered body of the present invention obtained through the first stretching step and the second stretching step, the retardation in the A layer and the retardation in the B layer that are expressed during the first stretching step and the second stretching step are combined, whereby the desired retardation is generated in the layer portion other than the C layer (that is usually the layered body of the A layer and the B layer and corresponds to the phase difference film). In this case, the C layer is also stretched in the first stretching step and the second stretching step, so that retardation may be expressed also in the C layer. However, since the C layer is removed from the phase difference film layered body of the present invention upon using as the phase difference film, the retardation of the C layer has no influence on the control of the retardation of the phase difference film. Therefore, in the phase difference film obtained from the phase difference film layered body of the present invention, the number of components that have an influence on the control of retardation can be reduced, so that the retardation can be easily controlled.

By co-stretching the pre-stretch film including the (a) layer, the (b) layer, and the (c) layer, the producing process can be shortened, and the producing cost can be reduced, as compared with an instance wherein the phase difference film layered body of the present invention is produced by bonding an A layer, a B layer, and a C layer that has been separately stretched. The (b) layer consisting of the resin having a negative intrinsic birefringence value alone cannot be easily stretched, and stretching unevenness and fracture may occur. However, by layering the (b) layer with other layers (the (a) layer and the (c) layer), the (b) layer can be stably co-stretched, and variations in the thickness of the B layer can be reduced.

The removed C layer may be merely disposed or may be again melted for re-using as the material of the (c) layer, but may also be used as an optical film. When the C layer is used as an optical film, the thickness etc. of the C layer may be controlled such that the retardation required for the optical film is expressed in the C layer by stretching.

[3-4. Other Steps]

In the method for producing the phase difference film layered body of the present invention, an optional step may be performed in addition to the pre-stretch film preparing step, the first stretching step, and the second stretching step described above.

For example, a step of pre-heating the pre-stretch film (a pre-heating step) may be performed before stretching the pre-stretch film. Examples of the means for heating the pre-stretch film may include an oven-type heater, a radiation heater, and immersion into a liquid. Of these, an oven-type heater is preferred. The heating temperature in the pre-heating step is usually equal to or higher than (the stretching temperature−40° C.) and preferably equal to or higher than (the stretching temperature−30° C.), and is usually equal to or lower than (the stretching temperature+20° C.) and preferably equal to or lower than (the stretching temperature+15° C.). The stretching temperature means the temperature at which the heater's temperature is set.

For example, after the first stretching step and/or the second stretching step, the stretched film may be subjected to a fixing treatment. The temperature in the fixing treatment is usually equal to or higher than room temperature and preferably equal to or higher than (the stretching temperature−40° C.), and is usually equal to or lower than (the stretching temperature+30° C.) and preferably equal to or lower than (the stretching temperature+20° C.).

Further, the step of providing, e.g., a mat layer, a hard coating layer, an anti-reflection layer, and an antifouling layer on, e.g., the surface of the obtained phase difference film layered body may be performed.

[4. Others]

The phase difference film obtained from the phase difference film layered body of the present invention is capable of providing a high-level birefringence compensation. Therefore, the phase difference film may be used alone or in combination with another member and may be applied to, e.g., liquid crystal display devices, organic electroluminescent display devices, plasma display devices, FED (field emission display) devices, and SED (surface field emission display) devices.

Usually, a liquid crystal display device includes a liquid crystal panel in which a light incident-side polarizing plate, a liquid crystal cell, and a light emission-side polarizing plate are disposed in this order. By disposing the phase difference film, e.g., between the liquid crystal cell and the light incident-side polarizing plate and/or between the liquid crystal cell and the light emission-side polarizing plate, the visibility of the liquid crystal display device can be significantly improved.

Examples of the driving mode of the liquid crystal cell may include an in-plane switching (IPS) mode, a vertical alignment (VA) mode, a multi-domain vertical alignment (MVA) mode, a continuous pinhole alignment (CPA) mode, a hybrid alignment nematic (HAN) mode, a twisted nematic (TN) mode, a super twisted nematic (STN) mode, and an optical compensated bend (OCB) mode.

The phase difference film may be bonded onto the liquid crystal cell or the polarizing plate. The phase difference film may be bonded onto both sides of the polarizing plate or onto only one side. Two or more phase difference films may be used. Any publicly known adhesive may be used for bonding.

Usually, a polarizing plate includes a polarizer and protection films bonded onto both sides thereof. In place of the protection films, the phase difference films may be bonded directly onto the polarizer and used as protective films. In this case, protection films are omitted, so that the thickness, weight, and cost of the liquid crystal display device can be reduced.

EXAMPLES

The present invention will be specifically described by way of an Example. However, the present invention is not limited to the following Example. The present invention may be implemented with arbitrary modifications within a range that does not depart from the scope of claims and equivalents thereto. In the following description, "part" and "%" representing an amount are based on weight, unless otherwise specified.

[Evaluation Methods]

In the Example and Comparative Examples, evaluation was performed in accordance with the following methods.

(1) Measurement of Thickness of Film and Respective Layers

Thickness of a film was measured using a contact-type thickness meter.

Thickness of each layer constituting the film was measured as follows. The film was embedded in an epoxy resin and then sliced using a microtome ("RUB-2100" manufactured by YAMATO KOHKI INDUSTRIAL Co., Ltd.), and the cross section was observed under a scanning electron microscope for measurement.

(2) Measurement of Rupture Energy

A ball having a weight of 0.0055 kg was dropped from a certain height onto a film. From the height when the film was ruptured (rupture height), the rupture energy was calculated in accordance with the following formula. Whether or not the film was ruptured was determined by visually observing the film to check whether or not the film was deformed by the dropped ball.

Rupture energy (mJ)=ball weight (kg)×rupture height (cm)×9.8

(3) Measurement of Retardation Re at Incident Angle of 0° and Retardation $R_{40}$ at Incident Angle of 40°

The retardation Re at an incident angle of 0° and the retardation $R_{40}$ at an incident angle of 40° were measured using an automatic birefringence meter ("KOBRA-21ADH" manufactured by Oji Scientific Instruments) at a measurement wavelength of 590 nm.

(4) Evaluation of Curling

A film that has been subjected to stretching in the TD direction (crosswise stretching) was cut to have a 50 mm×50 mm piece. The film was placed in a forced convection oven (manufactured by ADVANTEC) at 130° C. for 2 minutes. After the film was taken out of the oven, the warped-up amount of curling was measured with a ruler. When the film was curled one turn or more, each turn was calculated as 15 mm.

(5) Measurement of Static Friction Coefficient

A static friction coefficient was measured using a static friction coefficient measurement device (manufactured by HEIDON). In the measurement, a pre-stretch film was cut to obtain a sample having a size of 200 mm×100 mm, which was then placed on a rising plate side of the measurement device. Another sample having a size of 75 mm×35 mm piece was also obtained by cutting the pre-stretch film, which was placed on a flat indenter side of the measurement device. In this case, the coefficient of static friction between the front and back surfaces of the samples was measured such that the surfaces of the samples that were in contact with each other were different from each other, i.e., the front surface of one sample was in contact with the back surface of the other sample.

(6) Evaluation of Handling Capability

The appearance of a film during production was visually observed. When rupture occurred during stretching, the film was evaluated as "poor". When no rupture occurred during stretching but fluttering occurred, the film was evaluated as "fair". When no rupture occurred during stretching and less fluttering occurred, the film was evaluated as "good".

Example 1

A twin screw extruder was prepared, and 100 parts by weight of a norbornene-based polymer ("ZEONOR 1430" manufactured by ZEON CORPORATION, glass transition temperature: 140° C.) and 2 parts by weight of silica particles ("ADMAFINE SO-C2" manufactured by Admatechs Company Limited, number-average particle diameter: 0.5 µm, refractive index: 1.46) were kneaded to produce pellets of a silica particle-containing polycycloolefin resin.

Then a film forming apparatus for three-type three-layer coextrusion molding (an apparatus of the type in which three types of resins were used to form a film consisting of three layers) was prepared.

Pellets of a polycarbonate resin ("WONDERLITE PC-115" manufactured by Asahi Kasei Corporation, glass transition temperature: 145° C.) as the resin having a positive intrinsic birefringence value were fed to a single screw extruder equipped with a double-flight type screw, for melting the pellets.

Pellets of a styrene-maleic anhydride copolymer resin ("Dylark D332" manufactured by Nova Chemicals, content of maleic anhydride unit: 17% by weight, glass transition temperature: 128° C.) as the resin having a negative intrinsic birefringence value were fed to a single screw extruder equipped with a double-flight type screw, for melting the pellets.

Pellets of the silica particle-containing polycycloolefin resin were fed to a single screw extruder equipped with a double-flight type screw, for melting the pellets.

The molten polycarbonate resin at 260° C. was supplied to a first manifold of a multi-manifold die (surface roughness on the die lip: Ra=0.1 µm) through a polymer filter having a leaf disc shape and a mesh of 10 µm. The molten styrene-maleic anhydride copolymer resin at 260° C. was supplied to a second manifold through a polymer filter having a leaf disc shape and a mesh of 10 µm. Further, the molten silica particle-containing polycycloolefin resin at 260° C. was supplied to a third manifold through a polymer filter having a leaf disc shape and a mesh of 10 µm.

The polycarbonate resin, the styrene-maleic anhydride copolymer resin, and the silica particle-containing polycycloolefin resin were extruded simultaneously at 260° C. from the multi-manifold die into a film shape. The molten resins coextruded into a film shape in this manner were casted onto a cooling roller having a surface temperature adjusted to 130° C. and then caused to pass between two cooling rollers having a surface temperature adjusted to 50° C. In this manner, a 105 µm-thick pre-stretch film having a three-layer structure including a polycarbonate resin layer (corresponding to the (a) layer, thickness: 10 µm), a styrene-maleic anhydride copolymer resin layer (corresponding to the (b) layer, thickness: 85 µm), and a silica particle-containing polycycloolefin resin layer (corresponding to the (c) layer, thickness: 10 µm) in this order was obtained.

The obtained pre-stretch film was placed with the polycarbonate resin layer vertically upward, and a ball was dropped thereonto in the aforementioned manner to measure the rupture energy. The measured rupture energy was 3.234

Using the obtained pre-stretch film, the static friction coefficient was measured in the aforementioned manner. The measured static friction coefficient was 0.4.

This pre-stretch film was subjected to uniaxial stretching using a tenter stretching apparatus at a stretching temperature of 150° C. and a stretching ratio of 3.0 times. As to the film obtained by removing the silica particle-containing polycycloolefin resin layer from the stretched film, retardation Re of linearly polarized light incident perpendicularly on the film surface and having a plane of vibration of its electric vector lying in an XZ plane with respect to linearly polarized light incident perpendicularly on the film surface and having a plane of vibration of its electric vector lying in a YZ plane was measured. The direction of uniaxial stretching herein is taken as an X axis, a direction orthogonal to the uniaxial stretching direction in the film plane is taken as a Y axis, and a direction of the thickness of the film is taken as a Z axis. It was found that the retardation Re was 36 nm, and the phase of the XZ polarized light was delayed.

Another stretching of the pre-stretch film and subsequent removal of the silica particle-containing polycycloolefin resin layer from the stretched film were performed by the same procedure as the aforementioned procedure except that the stretching temperature was changed to 128° C. As to the obtained film, the retardation Re of linearly polarized light incident perpendicularly on the film surface and having a plane of vibration of its electric vector lying in the XZ plane with respect to linearly polarized light incident perpendicularly on the film surface and having a plane of vibration of its electric vector lying in the YZ plane was measured. It was found that the retardation Re was −418 nm, and the phase of the XZ polarized light was advanced.

The aforementioned pre-stretch film was supplied to a crosswise stretching apparatus and stretched in the TD direction at a stretching temperature of 150° C. and a stretching ratio of 2.7 times. After the crosswise stretching, curling was evaluated in the aforementioned manner. The warped-up amount thus measured was 1.5 mm. Then, the stretched film was supplied to a longitudinal uniaxial stretching apparatus and stretched in the MD direction at a stretching temperature of 128° C. and a stretching ratio of 1.2 times. Thereby a phase difference film layered body including the polycarbonate resin layer (thickness: 3 μm), the styrene-maleic anhydride copolymer resin layer (thickness: 29 μm), and the silica particle-containing polycycloolefin resin layer (thickness: 3 μm) in this order was obtained with no rupture.

The silica particle-containing polycycloolefin resin layer was removed from the obtained phase difference film layered body, to thereby obtain a phase difference film consisting of the polycarbonate resin layer and the styrene-maleic anhydride copolymer resin layer. As to this phase difference film, retardation Re at the incident angle of 0° was 100.0 nm, retardation $R_{40}$ at the incident angle of 40° was 99.8 nm, and $R_{40}$/Re was 1.00.

Comparative Example 1

A film forming apparatus for two-type two-layer coextrusion molding (an apparatus of the type in which two types of resins were used to form a film consisting of two layers) was prepared.

Pellets of a polycarbonate resin ("WONDERLITE PC-115" manufactured by Asahi Kasei Corporation, glass transition temperature: 145° C.) as the resin having a positive intrinsic birefringence value were fed to a single screw extruder equipped with a double-flight type screw, for melting the pellets.

Pellets of a styrene-maleic anhydride copolymer resin ("Dylark D332" manufactured by Nova Chemicals, glass transition temperature: 128° C.) as the resin having a negative intrinsic birefringence value were fed to a single screw extruder equipped with a double-flight type screw, for melting the pellets.

The molten polycarbonate resin at 260° C. was supplied to one manifold of a multi-manifold die (surface roughness on the die lip: Ra=0.1 μm) through a polymer filter having a leaf disc shape and a mesh of 10 μm. The molten styrene-maleic anhydride copolymer resin at 260° C. was supplied to the other manifold through a polymer filter having a leaf disc shape and a mesh of 10 μm.

The polycarbonate resin and the styrene-maleic anhydride copolymer resin were extruded simultaneously at 260° C. from the multi-manifold die into a film shape. The molten resins coextruded into a film shape in this manner were casted onto a cooling roller having a surface temperature adjusted to 130° C. and then caused to pass between two cooling rollers having a surface temperature adjusted to 50° C. In this manner, a 95 μm-thick pre-stretch film having a two-layer structure including a polycarbonate resin layer (corresponding to the (a) layer, thickness: 10 μm) and a styrene-maleic anhydride copolymer resin layer (corresponding to the (b) layer, thickness: 85 μm) was obtained.

The obtained pre-stretch film was placed with the polycarbonate resin layer vertically upward, and a ball was dropped thereonto in the aforementioned manner to measure the rupture energy. The measured rupture energy was 1.617 mJ.

Using this pre-stretch film, the static friction coefficient was measured in the aforementioned manner. The measured static friction coefficient was 1.5.

The aforementioned pre-stretch film was supplied to a crosswise stretching apparatus and stretched in the TD direction at a stretching temperature of 150° C. and a stretching ratio of 2.7 times. After the crosswise stretching, curling was evaluated in the aforementioned manner. The warped-up amount thus measured was 22.5 mm. Then, the stretched film was supplied to a longitudinal uniaxial stretching apparatus and stretched in the MD direction at a stretching temperature of 128° C. and a stretching ratio of 1.2 times. Thereby a phase difference film including the polycarbonate resin layer (thickness: 3 μm) and the styrene-maleic anhydride copolymer resin layer (thickness: 29 μm) in this order was obtained. However, many ruptures occurred during stretching, so that it was difficult to collect a sample.

Comparative Example 2

A film forming apparatus for two-type three-layer coextrusion molding (an apparatus of the type in which two types of resins were used to form a film consisting of three layers) was prepared.

Pellets of a polycarbonate resin ("WONDERLITE PC-115" manufactured by Asahi Kasei Corporation, glass transition temperature: 145° C.) as the resin having a positive intrinsic birefringence value were fed to a single screw extruder equipped with a double-flight type screw, for melting the pellets.

Pellets of a styrene-maleic anhydride copolymer resin ("Dylark D332" manufactured by Nova Chemicals, glass transition temperature: 128° C.) as the resin having a negative intrinsic birefringence value were fed to a single screw extruder equipped with a double-flight type screw, for melting the pellets.

The molten polycarbonate resin at 260° C. was supplied to one manifold of a multi-manifold die (surface roughness on the die lip: Ra=0.1 μm) through a polymer filter having a leaf disc shape and a mesh of 10 μm. The molten styrene-maleic anhydride copolymer resin at 260° C. was supplied to the other manifold through a polymer filter having a leaf disc shape and a mesh of 10 μm.

The polycarbonate resin and the styrene-maleic anhydride copolymer resin were extruded simultaneously at 260° C. from the multi-manifold die into a film shape. The molten resins coextruded into a film shape in this manner were casted onto a cooling roller having a surface temperature adjusted to 130° C. and then caused to pass between two cooling rollers having a surface temperature adjusted to 50° C. In this manner, a 135 μm-thick pre-stretch film having a three-layer structure including a polycarbonate resin layer (corresponding to the (a) layer, thickness: 10 μm), a styrene-maleic anhydride copolymer resin layer (corresponding to the (b) layer, thickness: 120 μm), and a polycarbonate resin layer (corresponding to the (a) layer, thickness: 5 μm) in this order was obtained.

The obtained pre-stretch film was placed with the thicker polycarbonate resin layer vertically upward, and a ball was dropped thereonto in the aforementioned manner to measure the rupture energy. The measured rupture energy was 2.156 mJ.

Using this pre-stretch film, the static friction coefficient was measured in the aforementioned manner The measured static friction coefficient was 1.5.

The aforementioned pre-stretch film was supplied to a crosswise stretching apparatus and stretched in the TD direction at a stretching temperature of 150° C. and a stretching ratio of 2.7 times. After the crosswise stretching, curling was evaluated in the aforementioned manner. The warped-up amount thus measured was 1 mm. Then, the stretched film was supplied to a longitudinal uniaxial stretching apparatus and stretched in the MD direction at a stretching temperature of 128° C. and a stretching ratio of 1.2 times. Thereby a phase difference film including the polycarbonate resin layer (thickness: 3 μm), the styrene-maleic anhydride copolymer resin layer (thickness: 41 μm), and the polycarbonate resin layer (thickness: 2 μm) in this order was obtained. In Comparative Example 2, a small amount of fluttering was observed during conveyance of the film.

As to the obtained phase difference film, retardation Re at the incident angle of 0° was 110.0 nm, retardation $R_{40}$ at the incident angle of 40° was 109.8 nm, and $R_{40}$/Re was 1.00.

TABLE 1

[Evaluation results of Example 1 and Comparative Examples 1 and 2]

| | | Example 1 | Comparative Example 1 | Comparative Example 2 |
|---|---|---|---|---|
| Resin used | 1st layer | Poly-carbonate resin (PC-115) | Poly-carbonate resin (PC115) | Poly-carbonate resin (PC115) |
| | 2nd layer | Styrene-maleic anhydride copolymer resin (Dylark) | Styrene-maleic anhydride copolymer resin (Dylark) | Styrene-maleic anhydride copolymer resin (Dylark) |
| | 3rd layer | Silica particle-containing poly-cycloolefin resin (ZEONOR 1430 + silica) | — | Poly-carbonate resin (PC-115) |
| Thickness of each layer in pre-stretched film (μm) | 1st layer | 10 | 10 | 10 |
| | 2nd layer | 85 | 85 | 120 |
| | 3rd layer | 10 | — | 5 |
| Thickness of each layer after stretching (μm) | 1st layer | 3 | 3 | 3 |
| | 2nd layer | 29 | 29 | 41 |
| | 3rd layer | 3 | — | 2 |
| Rupture energy (mJ) | | 3.234 | 1.617 | 2.156 |
| Curling warped-up amount (mm) | | 1.5 | 22.5 | 1 |
| Static friction coefficient | | 0.4 | 1.5 | 1.5 |
| Handling capability | | Good | Poor | Fair |

[Discussion]

In Example 1, the phase difference film layered body of the present invention was obtained by simply performing the same procedure as in Comparative Examples 1 and 2, i.e., coextrusion and stretching. Therefore it was confirmed that the phase difference film layered body of the present invention can be easily produced without increasing the number of process steps.

The rupture energy measured in Example 1 was larger than those measured in Comparative Examples 1 and 2. This suggests that, regarding the phase difference film layered body obtained by stretching the aforementioned pre-stretch film, the phase difference film layered body in Example 1 would also have higher rupture energy than the rupture energy in Comparative Examples 1 and 2, and thus have high impact resistance.

The static friction coefficient measured in Example 1 was smaller than those measured in Comparative Examples 1 and 2. This suggests that, regarding the phase difference film layered body obtained by stretching the aforementioned pre-stretch film, the phase difference film layered body in Example 1 would also have better slidability than those of the phase difference films in Comparative Examples 1 and 2. In addition, since the curling in the TD direction after stretching was small in Example 1, the curling of the produced phase difference film layered body would also be small. This shows that the phase difference film layered body can be easily wound. Therefore, it was confirmed that the phase difference film layered body produced in Example 1 is excellent in handling capability.

When the silica particle-containing polycycloolefin resin layer was removed from the phase difference film layered body in Example 1 to form the phase difference film, the phase difference film satisfied the relationship of $0.92 \leq R_{40}/Re \leq 1.08$. Therefore it was confirmed that, in Example 1, the retardation of the phase difference film can be controlled using only two layers, i.e., the polycarbonate resin layer and the styrene-maleic anhydride copolymer resin layer, and therefore the retardation can be easily controlled and the thickness can be reduced.

The invention claimed is:
1. A phase difference film layered body comprising:
  an A layer consisting of a resin having a positive intrinsic birefringence value;
  a B layer consisting of a resin containing a styrene polymer and having a negative intrinsic birefringence value; and
  a C layer consisting of a resin containing a polymer having an alicyclic structure, in this order; wherein,
  a layer portion that is a portion of the layered body other than the C layer has retardation Re at an incident angle of 0° and retardation $R_{40}$ at an incident angle of 40° satisfying a relationship of $0.92 \leq R_{40}/Re \leq 1.08$,
  the B layer and the C layer are in direct contact with each other,
  the resin containing the polymer having an alicyclic structure contains particles, and
  an average primary particle diameter of the particles is equal to or larger than 0.3 μm and equal to or smaller than 1.0 μm.
2. The phase difference film layered body according to claim 1, wherein the resin having a positive intrinsic birefringence value contains polycarbonate.
3. A method for producing the phase difference film layered body according to claim 1, the method comprising:
  a step of coextruding the resin having a positive intrinsic birefringence value, the resin containing the styrene polymer and having a negative intrinsic birefringence value, and the resin containing the polymer having an alicyclic structure to thereby obtain a pre-stretch film, wherein
  the pre-stretch film includes a layer consisting of the resin having a positive intrinsic birefringence value, a layer consisting of the resin including the styrene polymer and having a negative intrinsic birefringence value, and a layer consisting of the resin containing the polymer having an alicyclic structure, wherein
  a layer portion that is a portion of the pre-stretch film other than the layer consisting of the resin containing the polymer having an alicyclic structure causes a phase delay when the pre-stretch film is uniaxially stretched in a direction of an X-axis at a temperature T1 and causes a phase advancement when the pre-stretch film is uniaxially stretched in the direction of the X-axis at a temperature T2 that is different from the temperature T1, the phase delay and the phase advancement being of a phase of linearly polarized light incident perpendicularly on a film surface and having a plane of vibration of an electric vector lying in an XZ plane with respect to a phase of linearly polarized light incident perpendicularly on the film surface and having a plane of vibration of an electric vector lying in a YZ plane wherein the X-axis is a direction of uniaxial stretching, the Y-axis is a direction in a film plane orthogonal to the direction of uniaxial stretching, and the Z-axis is a direction of a thickness of the film;
  a first stretching step of subjecting the pre-stretch film to a uniaxial stretching treatment in one direction at one of the temperatures T1 and T2; and
  a second stretching step of performing a uniaxial stretching treatment in a direction orthogonal to the direction for the uniaxial stretching treatment performed in the first stretching step at the different one of the temperatures T2 and T1.
4. A method for producing a phase difference film, comprising removing, from the phase difference film layered body according to claim 1, the C layer.
5. A method for producing a phase difference film, comprising:
  a step of coextruding a resin having a positive intrinsic birefringence value, a resin containing a styrene polymer and having a negative intrinsic birefringence value, and a resin containing a polymer having an alicyclic structure, to thereby obtain a pre-stretch film, wherein
  the pre-stretch film includes a layer consisting of the resin having a positive intrinsic birefringence value, a layer consisting of the resin including the styrene polymer and having a negative intrinsic birefringence value, and a layer consisting of the resin containing the polymer having an alicyclic structure in this order, wherein
  a layer portion that is a portion of the pre-stretch film other than the layer consisting of the resin containing the polymer having an alicyclic structure causes a phase delay when the pre-stretch film is uniaxially stretched in a direction of an X-axis at a temperature T1 and causes a phase advancement when the pre-stretch film is uniaxially stretched in the direction of the X-axis at a temperature T2 that is different from the temperature T1, the phase delay and the phase advancement being of a phase of linearly polarized light incident perpendicularly on a film surface and having a plane of vibration of an electric vector lying in an XZ plane with respect to a phase of linearly polarized light incident perpendicularly on the film surface and having a plane of vibration of an electric vector lying in a YZ plane wherein the X-axis is a direction of uniaxial stretching, the Y-axis is a direction in a film plane orthogonal to the direction of uniaxial stretching, and the Z-axis is a direction of a thickness of the film;
  a first stretching step of subjecting the pre-stretch film to a uniaxial stretching treatment in one direction at one of the temperatures T1 and T2;
  a second stretching step of performing a uniaxial stretching treatment in a direction orthogonal to the one direction for the uniaxial stretching treatment performed in the first stretching step at the different one of the temperatures T2 and T1, to thereby obtain a phase difference film layered body, wherein
  the phase difference film layered body includes an A layer consisting of the resin having a positive intrinsic birefringence value, a B layer including the styrene polymer and having a negative intrinsic birefringence value, and a C layer consisting of the resin containing the polymer having an alicyclic structure in this order, and wherein a layer portion that is a portion of the layered body other than the C layer has retardation Re at an incident angle of 0° and retardation $R_{40}$ at an incident angle of 40° satisfying a relationship of $0.92 \leq R_{40}/Re \leq 1.08$,
  the B layer and the C layer are in direct contact with each other,
  the resin containing the polymer having an alicyclic structure contains particles, and
  an average primary particle diameter of the particles is equal to or larger than 0.3 μm and equal to or smaller than 1.0 μm; and
  a step of removing the C layer from the phase difference film layered body.

6. A method for producing the phase difference film layered body according to claim 2, the method comprising:
  a step of coextruding the resin having a positive intrinsic birefringence value, the resin containing the styrene polymer and having a negative intrinsic birefringence value, and the resin containing the polymer having an alicyclic structure to thereby obtain a pre-stretch film, wherein
  the pre-stretch film includes a layer consisting of the resin having a positive intrinsic birefringence value, a layer consisting of the resin including the styrene polymer and having a negative intrinsic birefringence value, and a layer consisting of the resin containing the polymer having an alicyclic structure, wherein
  a layer portion that is a portion of the pre-stretch film other than the layer consisting of the resin containing the polymer having an alicyclic structure causes a phase delay when the pre-stretch film is uniaxially stretched in a direction of an X-axis at a temperature T1 and causes a phase advancement when the pre-stretch film is uniaxially stretched in the direction of the X-axis at a temperature T2 that is different from the temperature T1, the phase delay and the phase advancement being of a phase of linearly polarized light incident perpendicularly on a film surface and having a plane of vibration of an electric vector lying in an XZ plane with respect to a phase of linearly polarized light incident perpendicularly on the film surface and having a plane of vibration of an electric vector lying in a YZ plane wherein the X-axis is a direction of uniaxial stretching, the Y-axis is a direction in a film plane orthogonal to the direction of uniaxial stretching, and the Z-axis is a direction of a thickness of the film;
  a first stretching step of subjecting the pre-stretch film to a uniaxial stretching treatment in one direction at one of the temperatures T1 and T2; and
  a second stretching step of performing a uniaxial stretching treatment in a direction orthogonal to the direction for the uniaxial stretching treatment performed in the first stretching step at the different one of the temperatures T2 and T1.

7. The phase difference film layered body according to claim 1, wherein a thickness of the layer portion that is the portion of the layered body other than the C layer is equal to or larger than 10 μm and equal to or smaller than 100 μm.

8. The phase difference film layered body according to claim 1, wherein thickness variations of the A layer and the B layer in the entire surface are equal to or smaller than 1 μm.

9. The phase difference film layered body according to claim 1, wherein
  a thickness of the layer portion that is the portion of the layered body other than the C layer is equal to or larger than 10 μm and equal to or smaller than 100 μm, and
  a thickness of the C layer is equal to or larger than 0.5 μm and equal to or smaller than 20 μm.

10. The method for producing the phase difference film layered body according to claim 3 further comprising a step of subjecting a surface of the C layer to a roughening treatment.

11. The method for producing the phase difference film according to claim 5 further comprising a step of subjecting a surface of the C layer to a roughening treatment.

12. The method for producing the phase difference film according to claim 5, wherein a thickness of the layer portion that is the portion of the layered body other than the C layer is equal to or larger than 10 μm and equal to or smaller than 100 μm.

13. The method for producing the phase difference film according to claim 5, wherein thickness variations of the A layer and the B layer in the entire surface are equal to or smaller than 1 μm.

14. The method for producing the phase difference film according to claim 5, wherein
  a thickness of the layer portion that is the portion of the layered body other than the C layer is equal to or larger than 10 μm and equal to or smaller than 100 μm, and
  a thickness of the C layer is equal to or larger than 0.5 μm and equal to or smaller than 20 μm.

\* \* \* \* \*